United States Patent
Rugeland et al.

(10) Patent No.: US 10,952,110 B2
(45) Date of Patent: Mar. 16, 2021

(54) RADIO NETWORK NODES, WIRELESS DEVICE, AND METHODS PERFORMED THEREIN FOR HANDLING CONNECTIONS IN A WIRELESS COMMUNICATION NETWORK

(71) Applicant: Telefonaktiebolaget LM Ericsson (publ), Stockholm (SE)

(72) Inventors: Patrik Rugeland, Stockholm (SE); Rui Fan, Beijing (CN); Riikka Susitaival, Helsinki (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/464,735

(22) PCT Filed: Dec. 14, 2017

(86) PCT No.: PCT/SE2017/051270
§ 371 (c)(1),
(2) Date: May 29, 2019

(87) PCT Pub. No.: WO2018/128572
PCT Pub. Date: Jul. 12, 2018

(65) Prior Publication Data
US 2019/0289510 A1    Sep. 19, 2019

Related U.S. Application Data

(60) Provisional application No. 62/443,022, filed on Jan. 6, 2017.

(51) Int. Cl.
*H04W 36/00*        (2009.01)
*H04W 36/30*        (2009.01)
(Continued)

(52) U.S. Cl.
CPC ... *H04W 36/0079* (2018.08); *H04W 36/0069* (2018.08); *H04W 36/30* (2013.01);
(Continued)

(58) Field of Classification Search
None
See application file for complete search history.

(56) References Cited

U.S. PATENT DOCUMENTS 10,064,051 B2 *   8/2018   Ingale ............... H04W 12/1204
2015/0117183 A1 *  4/2015   Heo .......................... H04W 4/90
370/228

(Continued)

OTHER PUBLICATIONS

Broadcom Corporation, "Mobility for dual connectivity", 3GPP TSG RANWG2 Meeting #81bis, Apr. 15-19, 2013, pp. 1-7, Chicago, US, R2-130990.

(Continued)

*Primary Examiner* — Edan Orgad
*Assistant Examiner* — Emmanuel K Maglo
(74) *Attorney, Agent, or Firm* — Coats + Bennett, PLLC

(57) ABSTRACT

Embodiments herein disclose a method performed by a wireless device (10) for handling connections in a wireless communication network, wherein the wireless device (10) is configured with a split signaling radio bearer to a first radio network node (12), being a master radio network node, and a second radio network node (13), being a secondary radio network node. The wireless device detects a radio link problem to the first radio network node (12); and transmits a failure report to the first radio network node (12) over the split signaling radio bearer via the second radio network node (13). The failure report indicates the radio link problem to the first radio network node (12).

16 Claims, 16 Drawing Sheets

(51) Int. Cl.
*H04W 76/19* (2018.01)
*H04W 76/15* (2018.01)
*H04W 16/32* (2009.01)

(52) U.S. Cl.
CPC ........... *H04W 76/15* (2018.02); *H04W 76/19* (2018.02); *H04W 16/32* (2013.01)

(56) References Cited

U.S. PATENT DOCUMENTS

| | | | |
|---|---|---|---|
| 2015/0133122 A1 | 5/2015 | Chen | |
| 2016/0150440 A1* | 5/2016 | Lee | H04W 76/27 455/422.1 |
| 2016/0249259 A1* | 8/2016 | Park | H04W 36/0055 |
| 2016/0255551 A1* | 9/2016 | Susitaival | H04J 11/00 370/334 |
| 2017/0013668 A1* | 1/2017 | Chang | H04W 76/15 |
| 2018/0049214 A1* | 2/2018 | Kubota | H04W 72/1268 |
| 2018/0092118 A1* | 3/2018 | Kim | H04W 72/1205 |
| 2018/0124612 A1* | 5/2018 | Babaei | H04W 16/14 |
| 2018/0302834 A1* | 10/2018 | Zhang | H04W 36/38 |

OTHER PUBLICATIONS

Intel Corporation, "Discussion on Bearer Split for SRB", 3GPP TSG-RAN2 Meeting #84, San Francisco, USA, Nov. 11, 2013, pp. 1-3, R2-134404, 3GPP.

3rd Generation Partnership Project, "3rd Generation Partnership Project; Technical Specification Group Radio Access Network; Evolved Universal Terrestrial Radio Access (E-UTRA); Radio Resource Control (RRC); Protocol Specification (Release 14)", Technical Specification, 3GPP TS 36.331 V14.0.0, Sep. 1, 2016, pp. 1-644, 3GPP.

3rd Generation Partnership Project, "3rd Generation Partnership Project; Technical Specification Group Radio Access Network; Evolved Universal Terrestrial Radio Access (E-UTRA); Requirements for Support of Radio Resource Management (Release 14)", Technical Specification, 3GPP TS 36.133 V14.0.0, Jun. 1, 2016, pp. 1-2046, 3GPP.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14)", Technical Specification, 3GPP TS 36.300 V14.0.0, Sep. 1, 2016, pp. 1-314, 3GPP.

3rd Generation Partnership Project, "3rd Generation Partnership Project; Technical Specification Group Radio Access Network; Evolved Universal Terrestrial Radio Access (E-UTRA); Physical Layer Procedures (Release 14)", Technical Specification, 3GPP TS 36.213 V14.0.0, Sep. 1, 2016, pp. 1-406, 3GPP.

3rd Generation Partnership Project, "3rd Generation Partnership Project; Technical Specification Group Radio Access Network; Evolved Universal Terrestrial Radio Access (E-UTRA); User Equipment (UE) Conformance Specification Radio Transmission and Reception Part 1: Conformance Testing; (Release 14)", Technical Specification, 3GPP TS 36.521-1 V14.0.0, Sep. 1, 2016, pp. 1-3728, 3GPP.

* cited by examiner

RADIO NETWORK NODES, WIRELESS DEVICE, AND METHODS PERFORMED THEREIN FOR HANDLING CONNECTIONS IN A WIRELESS COMMUNICATION NETWORK

TECHNICAL FIELD

Embodiments herein relate to a first radio network node, a second radio network node, a wireless device, and methods performed therein regarding wireless communication. Furthermore, a computer program and a computer-readable storage medium are also provided herein. In particular, embodiments herein relate to handling connections of the wireless device in a wireless communication network.

BACKGROUND

In a typical wireless communication network, wireless devices, also known as wireless communication devices, mobile stations, stations (STA) and/or user equipments (UE), communicate via a Radio access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the radio network node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural access nodes connected thereto. The RNCs are typically connected to one or more core networks.

Specifications for the Evolved Packet System (EPS) are also handled by the 3$^{rd}$ Generation Partnership Project (3GPP), such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that a transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

In order to detect radio link failures (RLF) a wireless device implements a radio link monitoring (RLM) mechanism, which is described in 3GPP TS 36.331 v.14.0.0. RLM parameters are configured by Radio Resource Control (RRC). For this purpose the wireless device evaluates the radio link and upon a number, e.g. N310, consecutive "out-of-synchronization" (OOS) indications received from lower layers (see 3GPP TR 36.133 v.14.0.0 for details), the wireless device starts a timer referred to as T310, see FIG. 1A. The timer may be stopped upon another number, denoted N311, consecutive "in-synchronization" indications. After expiry of the timer T310 the wireless device may declare RLF to be detected and start an RRC reestablishment procedure by transmitting RRCConnectionReestablishmentRequest to try to recover the RRC connection with the network. Once an RRC connection is restored, the wireless device may send an RLF report to the radio network node to give radio network node more detailed information.

The interruption time due to RRC connection re-establishment procedure is a bit long as the wireless device need to wait for the timer T310 to expire, which may typically be 1-2 seconds, in order to avoid false RLF detections. It turns off its transmitter for 40 and then performs a cell reselection, and after that it sends an RRC connection re-establishment request message to the Network (NW). The interruption duration in average may e.g. be 70 ms.

In LTE Rel-12, dual connectivity (DC) was introduced, where a wireless device could connect to two different radio network nodes, such as eNBs, simultaneously. One of the radio network nodes would be the master eNB (MeNB) where the control plane terminates and the other radio network node would be the secondary eNB (SeNB) which provides additional capacity (bandwidth) to the wireless device. The wireless device is also configured with two different cell groups, a Master cell group (MCG) and a Secondary cell group (SCG) associated to the MeNB and the SeNB respectively.

The wireless device will send measurement reports on the cells when specific criteria are fulfilled, e.g. neighbor cell is a threshold better than serving cell, or neighbor cell is better than a threshold, and the network may reconfigure the wireless device to be handed over to another cell if that cell is sufficiently better. This may be done independently for both the MCG and the SCG. However, since the security in the SeNB is derived from the MeNB, any change in MeNB will require an update of the SeNB.

If the SCG fails, e.g. due to overload, poor signal quality, time-out, or similar, the wireless device generates an RLF report containing information regarding e.g. neighbor cells and signal strengths, which it sends to the MeNB. The MeNB may either release all SCG configurations or reconfigure the wireless device with a new SeNB. If the MCG fails both the MeNB and the SeNB are released and the wireless device attempts to perform a reestablishment to the MeNB (or another cell).

During LTE Rel-12, it was proposed to introduce a concept known as RRC-diversity where a wireless device could have signal radio bearers (SRB) between the wireless device and the SeNB. Similar to the data radio bearers (DRB) this may be realized with two separate bearers (with independent RRC entities), or with a split SRB where the RRC messages are generated by the MeNB but may be forwarded (or duplicated) via the SeNB as can be seen in FIG. 1B, wherein Packet Data Convergence Protocol (PDCP), Radio Link Control (RLC) and Medium Access Control (MAC) entities are shown. When the wireless device is configured with dual connectivity (DC), it is connected to a master eNB (MeNB) and a secondary eNB (SeNB). If the connection to the MeNB deteriorates, the wireless device declares RLF resetting connections, which will cause a long interruption of the connectivity leading to a reduced or limited performance of the wireless communication network.

SUMMARY

An object of embodiments herein is to provide a mechanism that improves the performance of the wireless communication network when using dual connectivity in the wireless communication network.

According to an aspect the object is achieved by providing a method performed by a wireless device for handling connections in a wireless communication network. The wireless device is configured with a split signaling radio bearer (split SRB) to a first radio network node, being a master radio network node, and a second radio network node, being a secondary radio network node. The wireless device detects a radio link problem to the first radio network node, and transmits a failure report to the first radio network node over the split signaling radio bearer via the second radio network node. The failure report indicates the radio link problem to the first radio network node.

According to another aspect the object is achieved by providing a method performed by a first radio network node for handling connections of a wireless device in a wireless communication network, wherein the first radio network node is a master radio network node in a dual connectivity setup to the wireless device. The dual connectivity setup provides a split signaling radio bearer to the wireless device from the first radio network node and from a second radio network node, being a secondary radio network node. The first radio network node receives a failure report from the wireless device via the second radio network node, which failure report indicates a radio link problem between the first radio network node and the wireless device. The first radio network node further performs an evaluation of the failure report for initiating a handover process of the wireless device.

According to yet another aspect the object is achieved by providing a method performed by a second radio network node for handling connections of a wireless device in a wireless communication network. The second radio network node is a secondary radio network node in a dual connectivity setup to the wireless device, wherein the dual connectivity setup provides a split signaling radio bearer to the wireless device from the secondary radio network node and from a first radio network node, being a master radio network node. The second radio network node receives a failure report from the wireless device over the split signaling radio bearer, which failure report indicates a radio link problem between the first radio network node and the wireless device. The second radio network node forwards the failure report to the first radio network node.

It is herein also provided a computer program comprising instructions, which, when executed on at least one processor, causes the at least one processor to carry out the methods herein, as performed by the wireless device, the first radio network node or the second radio network node. Furthermore, it is herein provided a computer-readable storage medium, having stored thereon a computer program comprising instructions which, when executed on at least one processor, cause the at least one processor to carry out the methods herein, as performed by the wireless device, the first radio network node or the second radio network node.

Furthermore, a wireless device, a first radio network node, and a second radio network node configured to perform the methods herein are also provided.

According to still another aspect the object is achieved by providing a wireless device for handling connections in a wireless communication network. The wireless device is configured with a split signaling radio bearer to a first radio network node, being a master radio network node, and a second radio network node, being a secondary radio network node. The wireless device is configured to detect a radio link problem to the first radio network node; and to transmit a failure report to the first radio network node over the split signaling radio bearer via the second radio network node. The failure report indicates the radio link problem to the first radio network node.

According to yet still another aspect the object is achieved by providing a first radio network node for handling connections of a wireless device in a wireless communication network. The first radio network node is configured as a master radio network node in a dual connectivity setup to the wireless device, wherein the dual connectivity setup provides a split signaling radio bearer to the wireless device from the first radio network node and from a second radio network node, being a secondary radio network node. The first radio network node is configured to receive a failure report from the wireless device via the second radio network node, which failure report indicates a radio link problem between the first radio network node and the wireless device. The first radio network node is further configured to perform an evaluation of the failure report for initiating a handover process of the wireless device.

According to another aspect the object is achieved by providing a second radio network node for handling connections of a wireless device in a wireless communication network. The second radio network node is configured as a secondary radio network node in a dual connectivity setup to the wireless device, wherein the dual connectivity setup provides a split signaling radio bearer to the wireless device from the secondary radio network node and from a first radio network node, being a master radio network node. The second radio network node is configured to receive a failure report from the wireless device over the split signaling radio bearer, which failure report indicates a radio link problem between the first radio network node and the wireless device. The second radio network node is further configured to forward the failure report to the first radio network node.

Embodiments herein enable a quick response to RLF at the first radio network node with significantly reduced service interruption by transmitting the failure report via the second radio network node to the first radio network node allowing a handover of the wireless device within the first radio network node, to the second radio network node or a third radio network node. Thus, embodiments herein utilize the split SRB to avoid a full RLF with a long service interruption, when the connection to the first radio network node fails by reporting the RLF via the second radio network node, on the split SRB, to trigger a handover either to e.g. a cell inside a SCG at the second radio network node or a cell outside both the MCG and the SCG at either the first radio network node, the second radio network node, or a third radio network node. Hence, the reduced service interruption will result in an improved performance of the wireless communication network when using dual connectivity in the wireless communication network.

BRIEF DESCRIPTION OF THE DRAWINGS

Embodiments will now be described in more detail in relation to the enclosed drawings, in which.

DETAILED DESCRIPTION

Figure 1A:
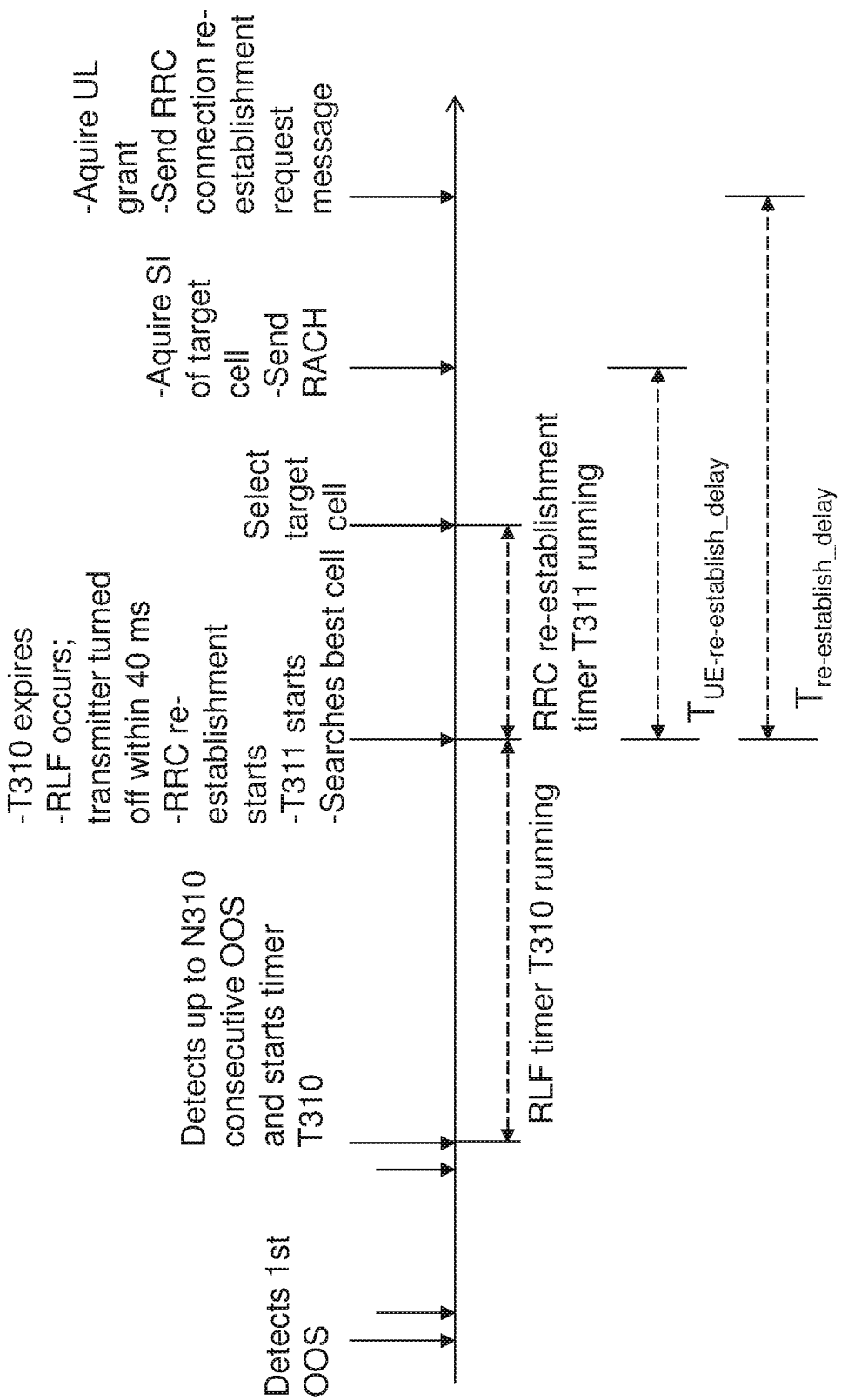
FIG. 1A shows a schematic process of a RLF process according to prior art.
Figure 1B:
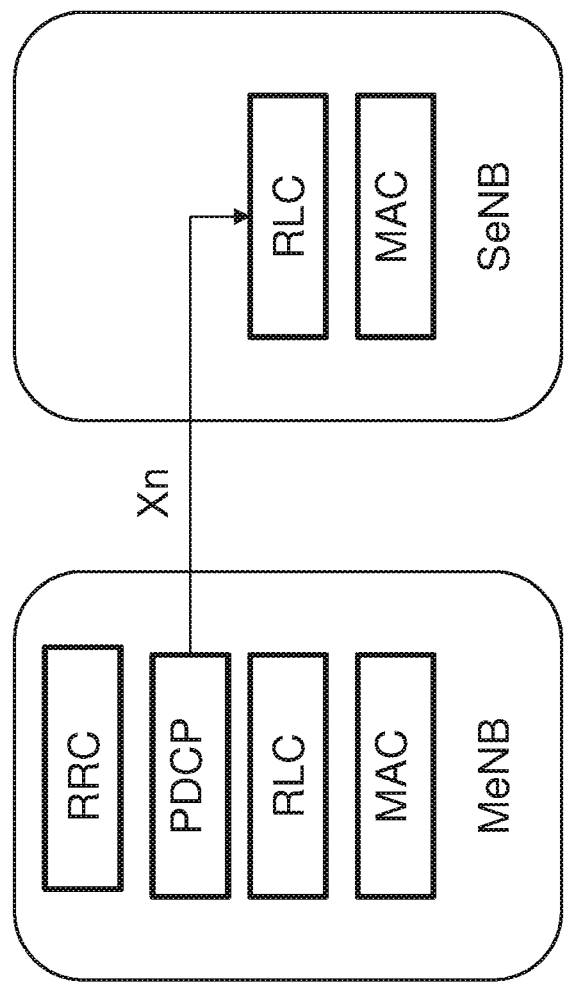
FIG. 1B shows a block diagram disclosing usage of a split SRB.
Figure 2:
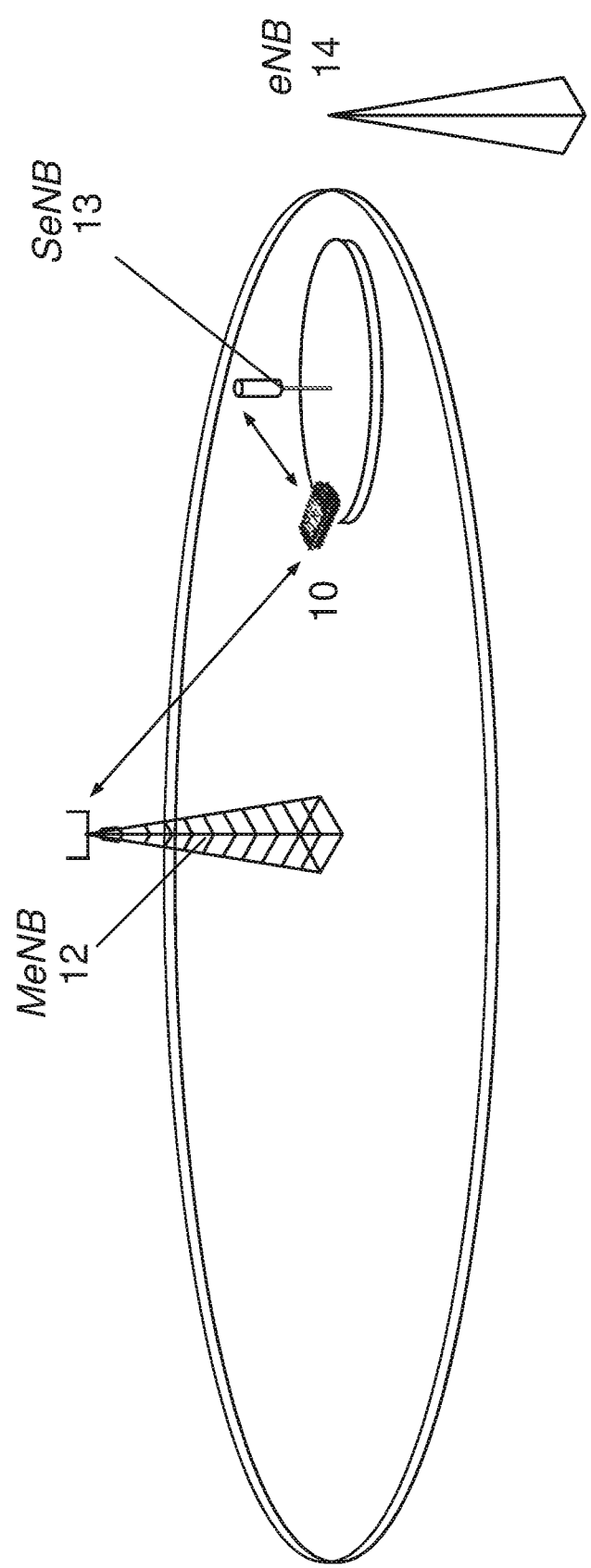
FIG. 2 shows a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as Wi-Fi, LTE, LTE-Advanced, Fifth Generation (5G), Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context. However, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12, providing radio coverage over a geographical area, a first service area or a first beam, of a first radio access technology (RAT), such as NR, LTE, Wi-Fi, WiMAX or similar. The radio network node 12 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the radio network node 12 depending e.g. on the first radio access technology and terminology used. The radio network node 12 may be referred to as a serving radio network node 12 or a master radio network node e.g. comprised in a master cell group (MCG) and communicates with the wireless device 10 in form of DL transmissions to the wireless device 10 and UL transmissions from the wireless device 10.

A second radio network node 13 may further provide radio coverage over a second service area or a second beam of a second RAT, such as NR, LTE, Wi-Fi, WiMAX or similar. The second radio network node 13 may be a transmission and reception point e.g. a radio network node such as a Wireless Local-Area Network (WLAN) access point or an Access Point Station (AP STA), an access node, an access controller, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the second radio access technology and terminology used. The second radio network node 13 may be referred to as a secondary radio network node wherein the second service area may be referred to as a secondary serving cell or beam e.g. of a secondary cell group (SCG). The first and second RAT may be the same RAT or different RATs. The radio network nodes may have an isolated or distributed architectures and logical functions may be mapped to respective architecture.

The wireless device 10 is configured with RRC diversity using a split signaling radio bearer (SRB) i.e. for dual connectivity, and may transmit and receive RRC messages on the split SRB via either a master cell group (MCG), i.e. the first radio network node 12, or a secondary cell group (SCG), i.e. the second radio network node 13, or via both.

In dual connectivity the idea is that the wireless device 10 keeps connectivity to more than one radio network node at a time. Assuming that e.g. macro radio base stations are able to provide coverage and e.g. pico radio base stations are there only for capacity enhancements, i.e. no coverage holes, one alternative architecture is where the wireless device maintains a macro connectivity all the time, connected to the first radio network node 12 being a Master eNB (MeNB)), and adds a connectivity when it is in the coverage area of the second radio network node 13 also referred to as being connected to a Secondary eNB (SeNB)). When both connections are active or set up, the wireless device 10 may get data and/or control signalling from both radio network nodes over the split SRB or respective SRB.

According to embodiments herein, if the connection to the first radio network node 12, being a connection of the MCG, fails due to e.g. RLF due to e.g. overload, poor signal quality, time-out, or similar, this triggers the wireless device 10 to send a failure report, also referred to as failure information message, to the first radio network node 12 via the split signaling radio bearer (SRB) to the second radio network node 13, also referred to as SCG path of the split SRB. When the first radio network node 12 receives the failure report the first radio network node 12 evaluates the failure report for initiating a handover process of the wireless device. For example, the first radio network node 12 may evaluate whether to declare RLF for the wireless device to reestablish the connection or to trigger a handover of the wireless device to the SeNB or another radio network node such as a third radio network node 14 for being e.g. the master node in the dual connectivity setup. FIG. 2 shows a Dual connectivity operation with the wireless device 10 having multiple connections with both the first radio base station 12 and the second radio base station 13. The MeNB is the first radio base station 12, and the SeNB is the second radio base station 13.

Figure 3:
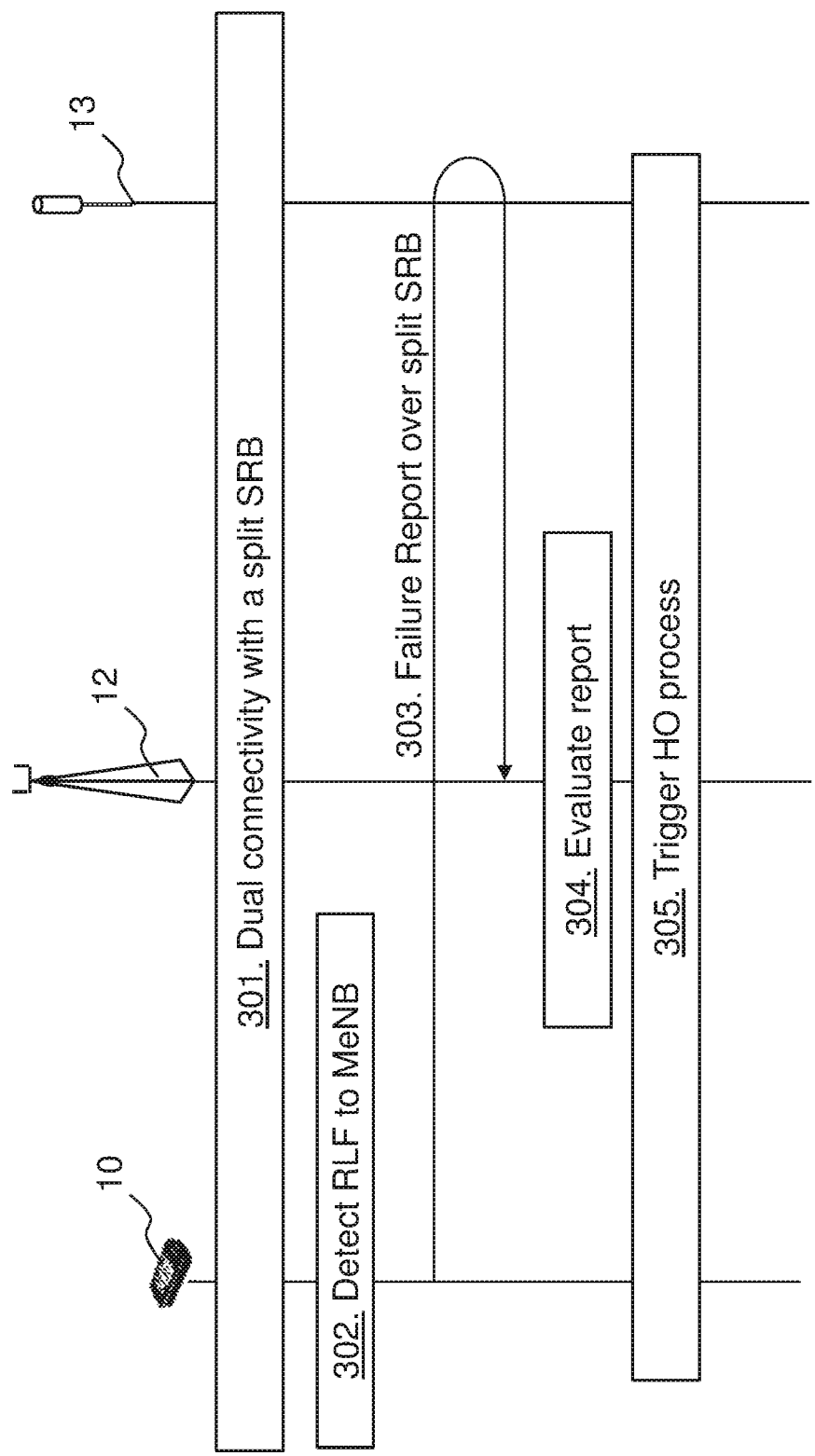
FIG. 3 is a combined flowchart and signalling scheme according to embodiments herein.

FIG. 3 is a combined flowchart and signalling scheme according to examples of embodiments herein.

Action 301. The wireless device 10 is configured with dual connectivity (DC) with the split SRB to both the first radio network node 12 and the second radio network node 13. Thus, the wireless device is connected to both the first radio network node 12 and the second radio network node 13.

Action 302. The wireless device 10 then detects a radio link problem to the first radio network node 12 e.g. detects a radio link failure (RLF) of the connection to the first radio network node 12. Thus, the wireless device 10 experiences a RLF on a connection to the MCG.

Action 303. According to embodiments herein the wireless device 10 may generate a failure report such as a MCG failure information message e.g. similar to a SCG failure information message in LTE DC. The wireless device 10 transmits the failure report to the first radio network node 12 over the split SRB via the second radio network node e.g. via a backhaul connection such as an X2 connection between the radio network nodes.

Action 304. The first radio network node 12 receives the failure report and performs an evaluation of the failure report. E.g. check reported signal strength or quality of signals associated to the second radio network node 13 or another radio network node such as the third radio network node 14 and compares e.g. to the reported signal strength or quality of the connection to the first radio network node 12.

Figure 4:
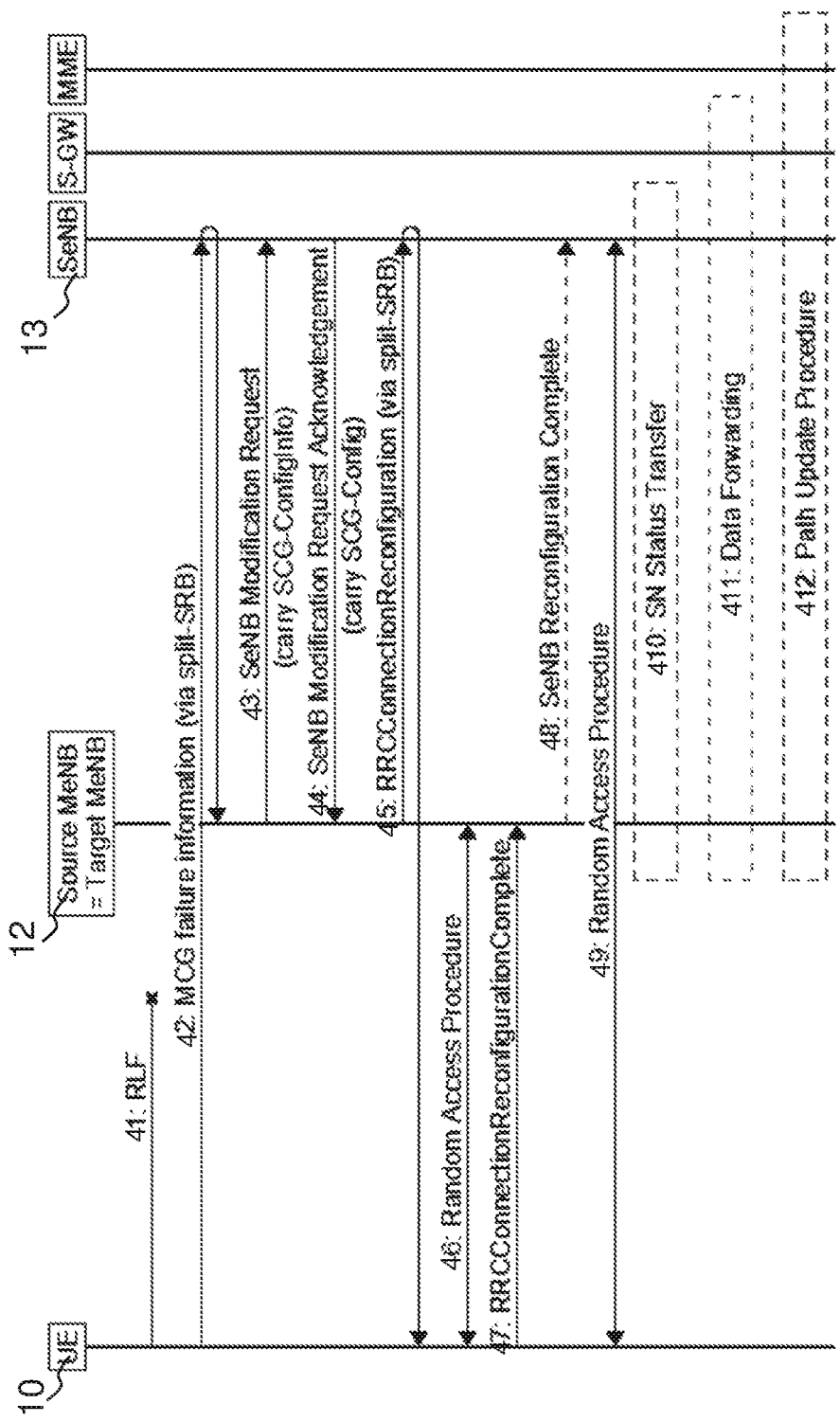
FIG. 4 is a signalling scheme depicting an embodiment herein.
Figure 5:
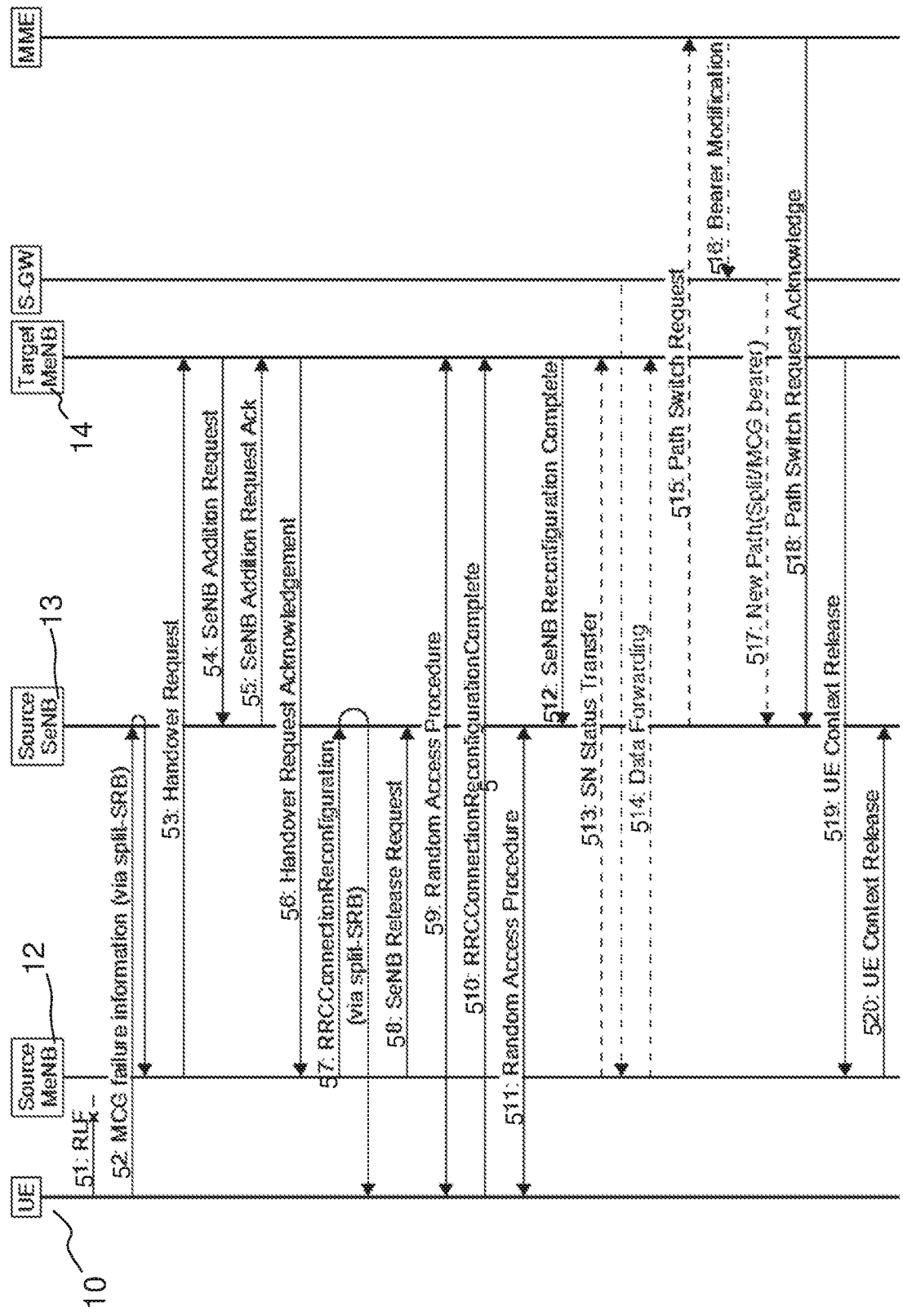
FIG. 5 is a signalling scheme depicting an embodiment herein.

Action 305. The first radio network node 12 may then, based on the evaluation, initiate a handover process of the wireless device 10 to e.g. the second radio network node 13. For example, when the first radio network node 12 receives the failure report this may trigger a handover to one of the cells indicated in the failure report. This cell may either belong to the previous (source) first radio network node 12 (FIG. 4), the previous second radio network node 13 (FIG. 6) or belong to the third radio network node 14 (FIG. 5). It should be noted that the evaluation may conclude that the first radio network node 12 shouldn't perform handover at all, but should declare RLF, e.g. if the signal strength or quality of the second and/or third radio network nodes are not good enough.

The procedures described below are based on the LTE dual connectivity procedure in TS 36.300 v. 14.0.0 with the addition, according to embodiments herein, that a radio link failure towards e.g. the MCG triggers a MCG failure information sent to the first radio network node 12, exemplified as an MeNB, via the split SRB. This in turn triggers that the first radio network node 12 may perform a handover to a suitable cell.

Intra-MeNB Handover with SeNB Change at RLF

In case there are cells provided by the MeNB, i.e. the first radio network node 12, which are not part of the MCG, and in case of RLF when all cells in the MCG fails, the first radio network node 12 may reconfigure the wireless device 10 via the SeNB, i.e. the second radio network node 13. The first radio network node 12 may reconfigure the wireless device 10 with the split SRB to use a new cell at the first radio network node 12 being outside the MCG e.g. by sending a handover command and may e.g. update the SeNB with new security keys as can be seen in the example illustrated in FIG. 4. E.g. if new security key needs to be updated for SeNB, the wireless device 10 may need to know this new security key for SeNB as well.

Action 41. An RLF occurs to the first radio network node 12.

Action 42. A failure report e.g. indicating MCG failure is sent via the second radio network node 13 to the first radio network node 12.

Action 43. An SeNB modification request is sent to the second radio network node 13 carrying SCG configure info.

Action 44. The second radio network node 13 may send an SeNB modification request acknowledgment (ACK) back to the first radio network node 12.

Action 45. An RRCconnection reconfiguration message is sent via the second radio network node 13 to the wireless device.

Action 46. The wireless device 10 performs a random access (RA) procedure.

Action 47. The wireless device 10 transmits an RRCconnection complete message to the first radio network node 12.

Action 48. The first radio network node 12 may transmit an RRCconnection complete message to the second radio network node 13.

Action 49. The wireless device 10 performs an RA procedure to the second radio network node 13.

Action 410. An SN status transfer is performed.

Action 411. A data forwarding is performed.

Action 412. A path update procedure is performed.

Inter-MeNB Handover Without SeNB Change at RLF

In case all cells in the MCG fails, and the measurements in the RLF report indicate a cell at another radio network node such as the third radio network node 14, the wireless device 10 may be handover to this other radio network node. This is shown in a signaling diagram in FIG. 5. In this case, the wireless device 10 keeps the second radio network node 13 as the SeNB after the handover, but since the second radio network node 13 may derive the security keys from the new MeNB i.e. the third radio network node 14, it is possible for the wireless device 10 to perform a new random access procedure to the second radio network node 13.

Action 51. An RLF occurs to the first radio network node 12.

Action 52. A failure report e.g. indicating MCG failure is sent via the second radio network node 13 to the first radio network node 12.

Action 53. A handover request is sent to the third radio network node 14.

Action 54. An SeNB addition request is sent to the second radio network node 13.

Action 55. The second radio network node 13 transmits an SeNB addition request ACK back to the third radio network node 14.

Action 56. The third radio network node 14 sends a handover request ACK back to the first radio network node 12.

Action 57. An RRCconnection reconfiguration message is sent via the second radio network node 13 to the wireless device 10.

Action 58. The first radio network node 12 transmits an SeNB release request to the second radio network node 13.

Action 59. The wireless device 10 performs a random access (RA) procedure to the third radio network node 14.

Action 510. The wireless device 10 transmits an RRCconnection complete message to the third radio network node 14.

Action 511. The wireless device 10 performs an RA procedure to the second radio network node 13.

Action 512. The SeNB reconfiguration complete message is sent to the second radio network node 13.

Action 513. A SN status transfer is performed.

Action 514. A data forwarding is performed.

Action 515. A path switch request is transmitted to an MME.

Action 516. The MME transmits a bearer modification to a serving gateway (S-GW).

Action 517. A new path is transmitted e.g. new split/MCG bearer.

Action 518. A path switch request ACK is transmitted to the second radio network node 13.

Action 519. The third radio network node 14 transmits a UE context release message to the first radio network node 12.

Action 520. The first radio network node transmits a UE context release message to the second radio network node 13.

A simplified alternative would be to release the SeNB and not to set it up after the handover to the target MeNB, i.e. the third radio network node 14.

MeNB to eNB Change in Source SeNB at RLF

Figure 6:
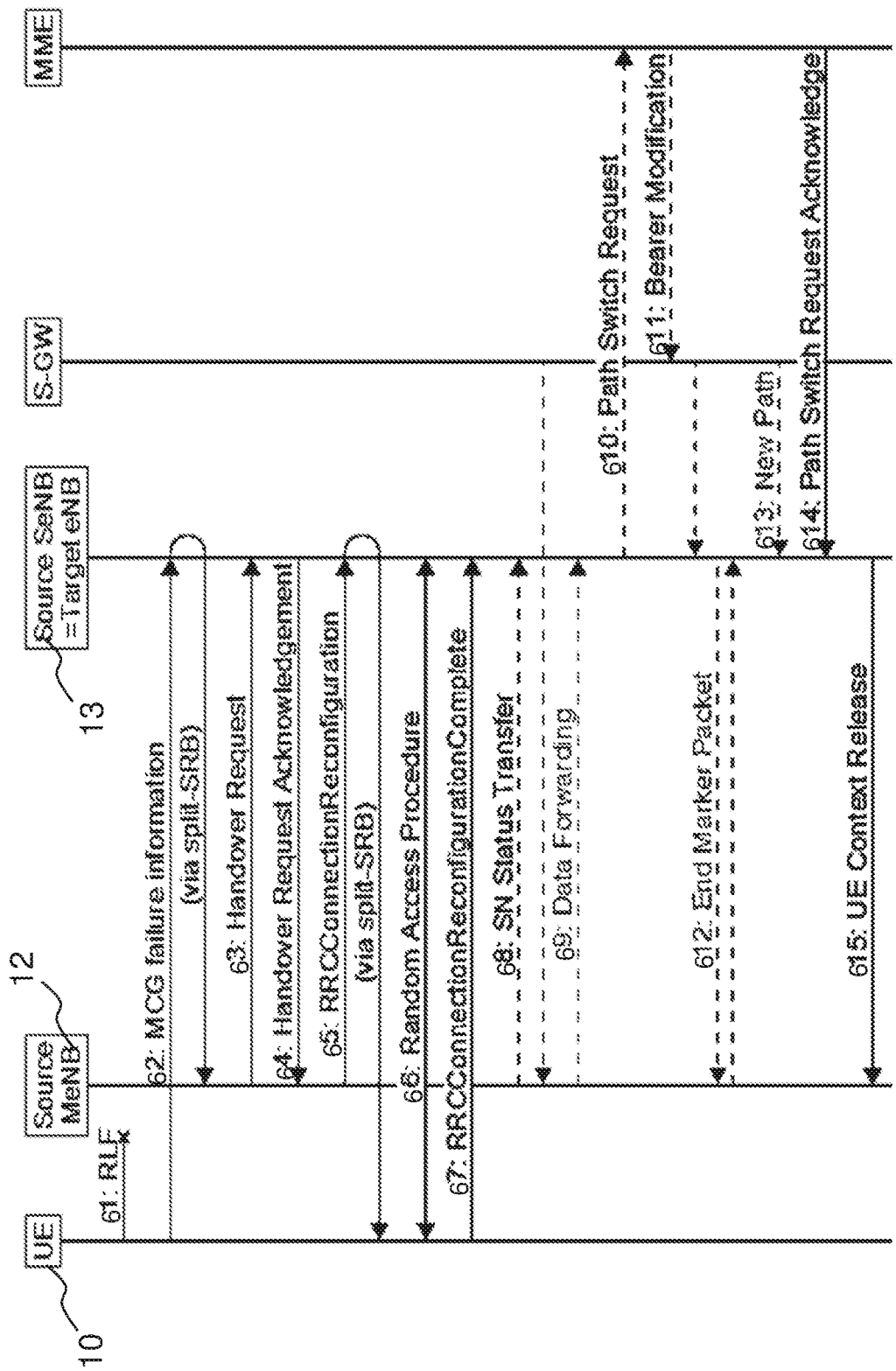
FIG. 6 is a signalling scheme depicting an embodiment herein.

A special case of the previous example is when the target radio network node is the same as the source SeNB, i.e. the second radio network node 13. The procedure is simplified as the source SeNB is the same as the target eNB as can be seen in FIG. 6. In this case it is not likely that the wireless device 10 would simultaneously add the source MeNB or the third radio network node 14 as a new SeNB as the complexity is greatly increased with little benefits. If an SeNB is required, this can be added in a separate procedure directly after the conclusion of this procedure.

Action 61. An RLF occurs to the first radio network node 12.

Action 62. A failure report e.g. indicating MCG failure is sent via the second radio network node 13 to the first radio network node 12.

Action 63. A handover request is sent to the second radio network node 13.

Action 64. The second radio network node 13 sends a handover request ACK back to the first radio network node 12.

Action 65. An RRCconnection reconfiguration message is sent via the second radio network node 13 to the wireless device 10.

Action 66. The wireless device 10 performs a random access (RA) procedure to the second radio network node 12.

Action 67. The wireless device 10 transmits an RRCconnection complete message to the second radio network node 13.

Action 68. An SN status transfer is performed.

Action 69. A data forwarding is performed.

Action 610. A path switch request is transmitted to an MME.

Action 611. The MME transmits a bearer modification to a serving gateway (S-GW).

Action 612. An end marker packet is transmitted to the first radio network node 12.

Action 613. A new path message is transmitted e.g. new split/MCG bearer to the second radio network node 12.

Action 614. A path switch request ACK is transmitted to the second radio network node 13.

Action 615. The second radio network node 13 transmits a UE context release message to the first radio network node 12.

Figure 7A:
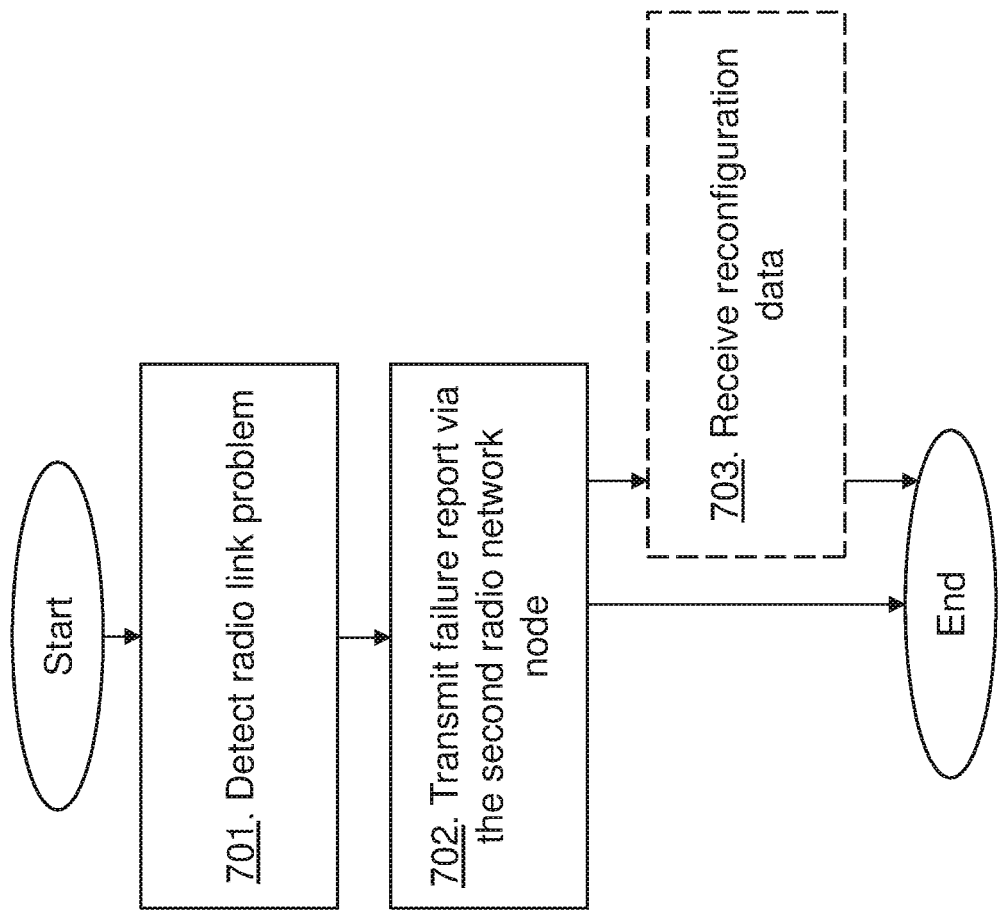
FIG. 7A shows a flowchart of a method performed by a wireless device according to embodiments herein.

The method actions performed by the wireless device 10 for handling connections in the wireless communication network 1 according to some embodiments will now be described with reference to a flowchart depicted in FIG. 7A. The actions do not have to be taken in the order stated below, but may be taken in any suitable order. Actions performed in some embodiments are marked with dashed boxes. The wireless device 10 is configured with the split SRB to the first radio network node 12, being the master radio network node, and the second radio network node 13, being the secondary radio network node. The wireless device may thus be configured with a dual connectivity to the master and the secondary node.

Action 701. The wireless device 10 detects the radio link problem to the first radio network node 12.

Action 702. The wireless device 10 transmits the failure report to the first radio network node 12 over the split SRB via the second radio network node 13. The failure report indicates the radio link problem to the first radio network node 12. The failure report may comprise signal strength or quality of signals from the first radio network node 12 and/or other radio network nodes.

Action 703. The wireless device 10 may receive reconfiguration data, via the second radio network node 13, over the split SRB indicating to use a new cell at the first radio network node 12 being outside a master cell group and/or of another radio network node.

Figure 7B:
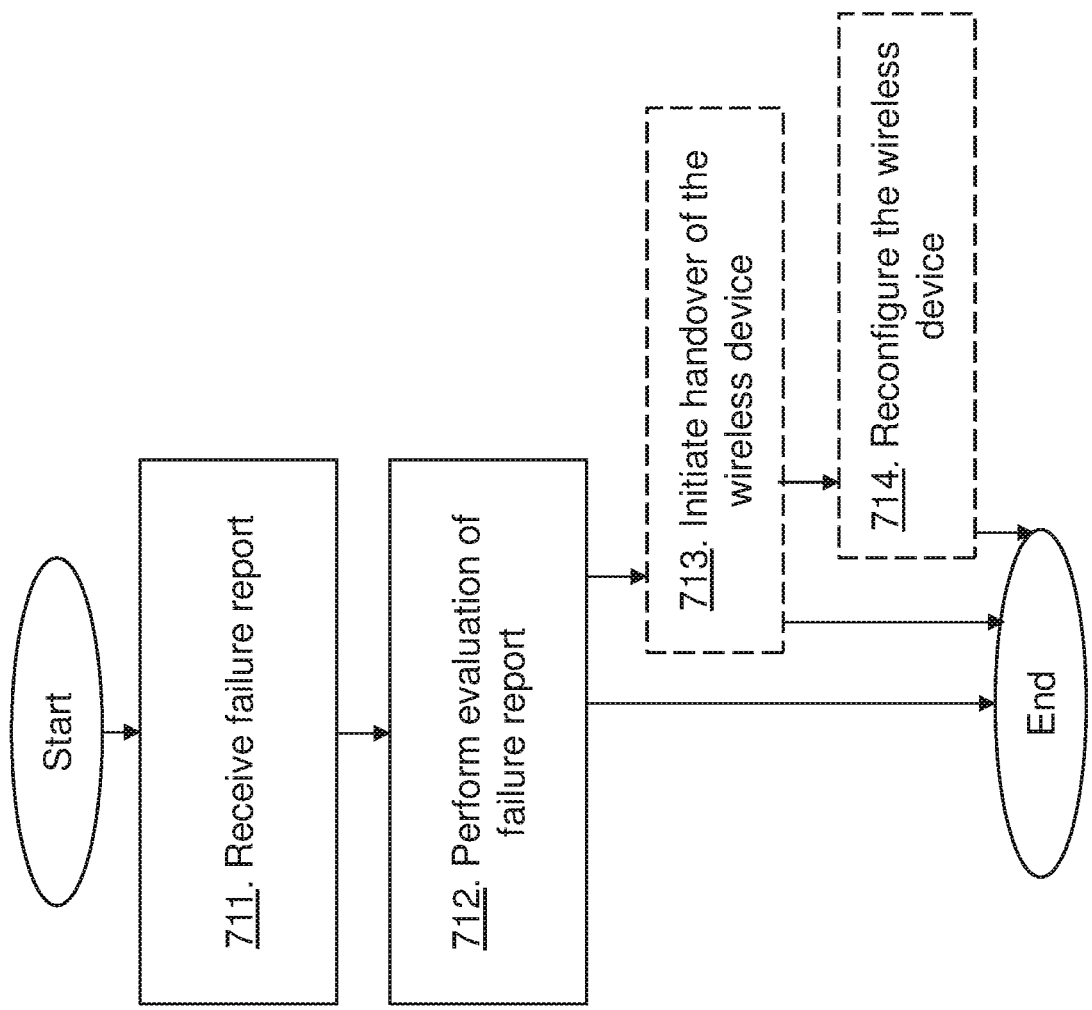
FIG. 7B shows a flowchart of a method performed by a first radio network node according to embodiments herein.

The method actions performed by the first radio network node 12 for handling connections of the wireless device in the wireless communication network 1 according to some embodiments will now be described with reference to a flowchart depicted in FIG. 7B. The actions do not have to be taken in the order stated below, but may be taken in any suitable order. Actions performed in some embodiments are marked with dashed boxes. The first radio network node is the master radio network node in a dual connectivity setup to the wireless device 10, wherein the dual connectivity setup provides the split SRB to the wireless device from the first radio network node 12 and from the second radio network node 13, being the secondary radio network node.

Action 711. The first radio network node 12 receives the failure report from the wireless device via the second radio network node 13, which failure report indicates the radio link problem between the first radio network node 12 and the wireless device 10. The failure report may be received over a backhaul connection, X2 connection.

Action 712. The first radio network node 12 performs the evaluation of the failure report for initiating a handover process of the wireless device 10.

Action 713. In the case when evaluation indicates initiation the first radio network node 12 may initiate the handover to a radio network node being within MCG, SCG or outside the MCG or the SCG.

Action 714. The first radio network node 12 may reconfigure, i.e. transmit reconfiguration data, the wireless device 10, via the second radio network node 13, over the split SRB to use a new cell at the first radio network node 12 being outside a master cell group or of another radio network node.

Figure 7C:
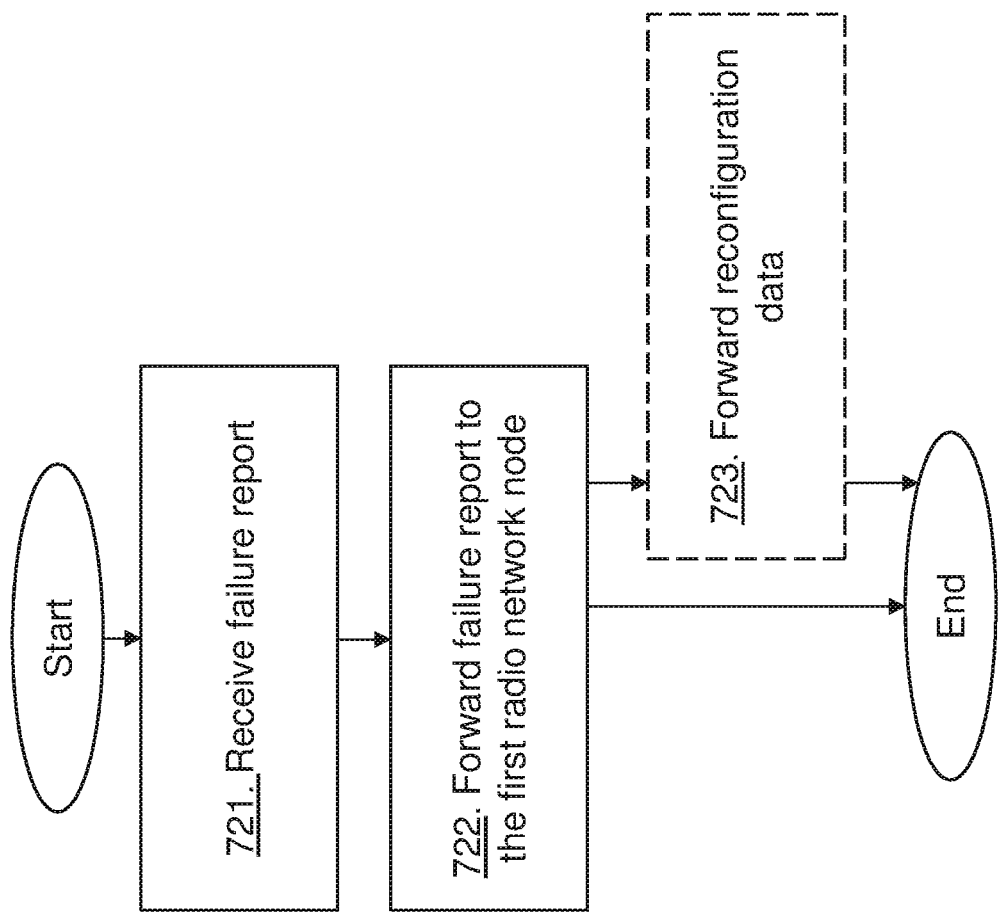
FIG. 7C shows a flowchart of a method performed by a second radio network node according to embodiments herein.

The method actions performed by the second radio network node 13 for handling connections of the wireless device in the wireless communication network 1 according to some embodiments will now be described with reference to a flowchart depicted in FIG. 7C. The actions do not have to be taken in the order stated below, but may be taken in any suitable order. Actions performed in some embodiments are marked with dashed boxes. The second radio network node 13 is the secondary radio network node in the dual connectivity setup to the wireless device 10, wherein the dual connectivity setup provides the split SRB to the wireless device from the secondary radio network node 13 and from the first radio network node 12 being the master radio network node.

Action 721. The second radio network node 13 receives the failure report from the wireless device 10 over the split SRB, which failure report indicates the radio link problem between the first radio network node 12 and the wireless device 10.

Action 722. The second radio network node 13 forwards the failure report to the first radio network node 12. The failure report may be forwarded over the backhaul connection to the first radio network node.

Action 723. The second radio network node 13 may forward reconfiguration data, from the first radio network node 12 to the wireless device 10, over the split SRB indicating to use a new cell at the first radio network node 12 being outside a master cell group and/or of another radio network node.

Signalling Radio Bearers

"Signalling Radio Bearers" (SRBs) are defined as Radio Bearers (RB) that are used only for the transmission of RRC and Non access Stratum (NAS) messages.

In downlink, piggybacking of NAS messages is used only for one dependant, i.e. with joint success/failure, procedure: bearer establishment/modification/release. In uplink piggybacking of NAS messages is used only for transferring the initial NAS message during connection setup.

The split SRB is used for control signalling and below is a description of a user plane signalling. Different user plane architectures may be divided into two categories:

1. Inter-bearer split dual connectivity. In this alternative, data of a single EPS bearer is transmitted over a single radio network node that may be either the first radio network node 12 or the second radio network node 13. As stated above the first radio network node 12 may be a MeNB and the second radio network node 13 may be an SeNB. Shown in FIG. 8A and called "Option 1", a particular EPS bearer is routed from a serving gateway (S-GW) 71 to the wireless device 10 either via the first radio network node 12 or via the second radio network node 13 directly. In "Option 2" all the traffic, i.e., all EPS bearers are first routed to the first radio network node 12. Then traffic of EPS bearers are sent to the wireless device 10 either directly from the first network node 12 or via the second radio network node 13.

2. Intra-bearer split dual connectivity. In this alternative, data of a single EPS bearer may be transmitted over different radio network nodes, that is, data is split over multiple radio network nodes. This may be achieved e.g. by routing all traffic to the first radio network node 12 and then forwarding some of the packets of certain bearer over the second radio network node 13 as shown in "Option 3" and some packets directly to the wireless device 10.

Figure 8A:
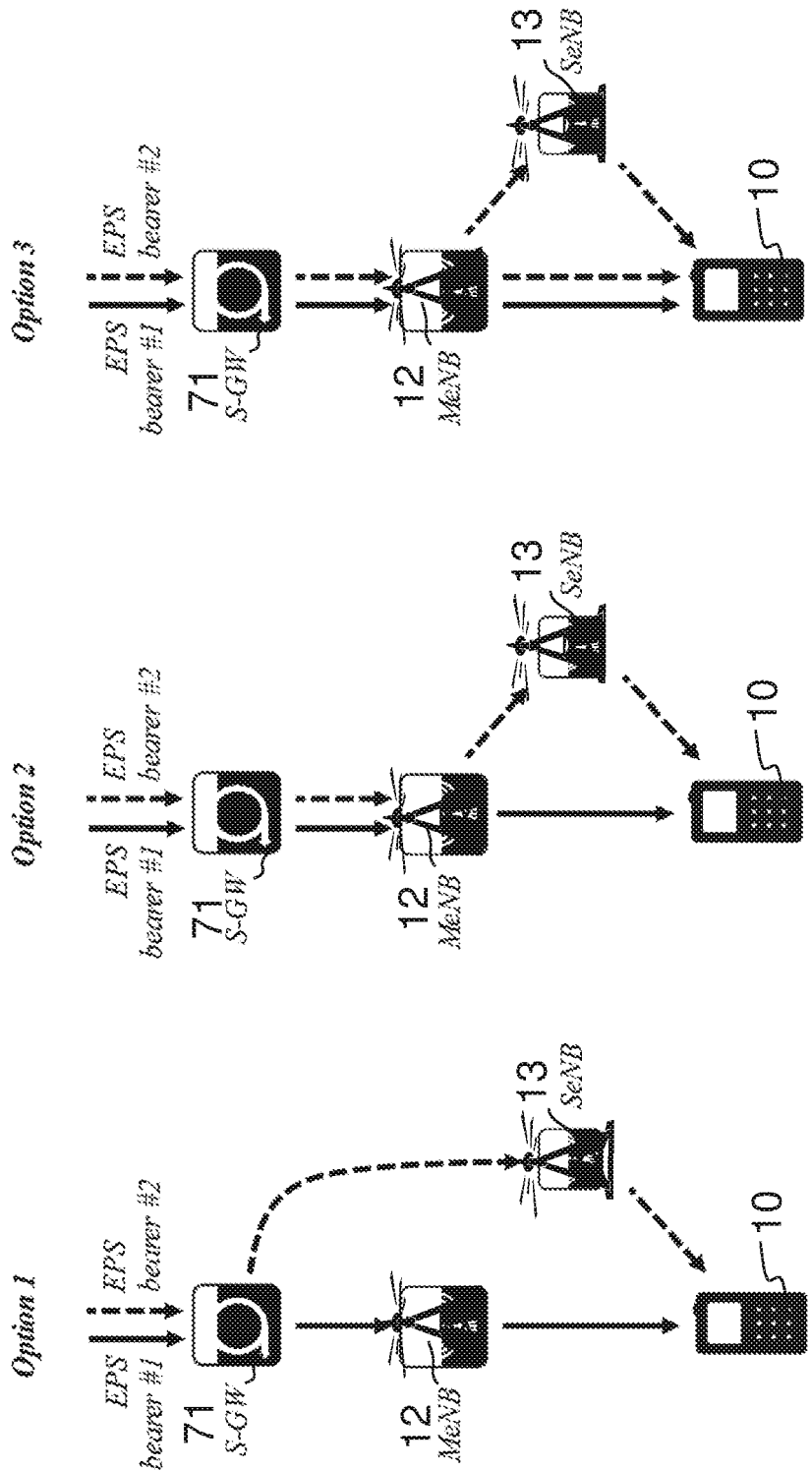
FIG. 8A shows split EPS bearer according to prior art.

The different schemes are depicted in FIG. 8A. In the "Option 1", the traffic split is done per EPS bearer, EPS bearer #1 and EPS bearer #2, and traffic of each EPS bearer is directly routed from the S-GW 71 to the wireless device 10 either via the first network node 12 or the second network node 13. In "Option 2", also traffic split is done per EPS bearer. The difference is that all bearers are routed over the first radio network node 12. Finally in "Option 3", there are some bearers routing over the first radio network node 12 directly to the wireless device 10 and some of the bearers of the EPS bearers #2 are split over the first radio network node 12 and the second radio network node 13.

Figure 8B:
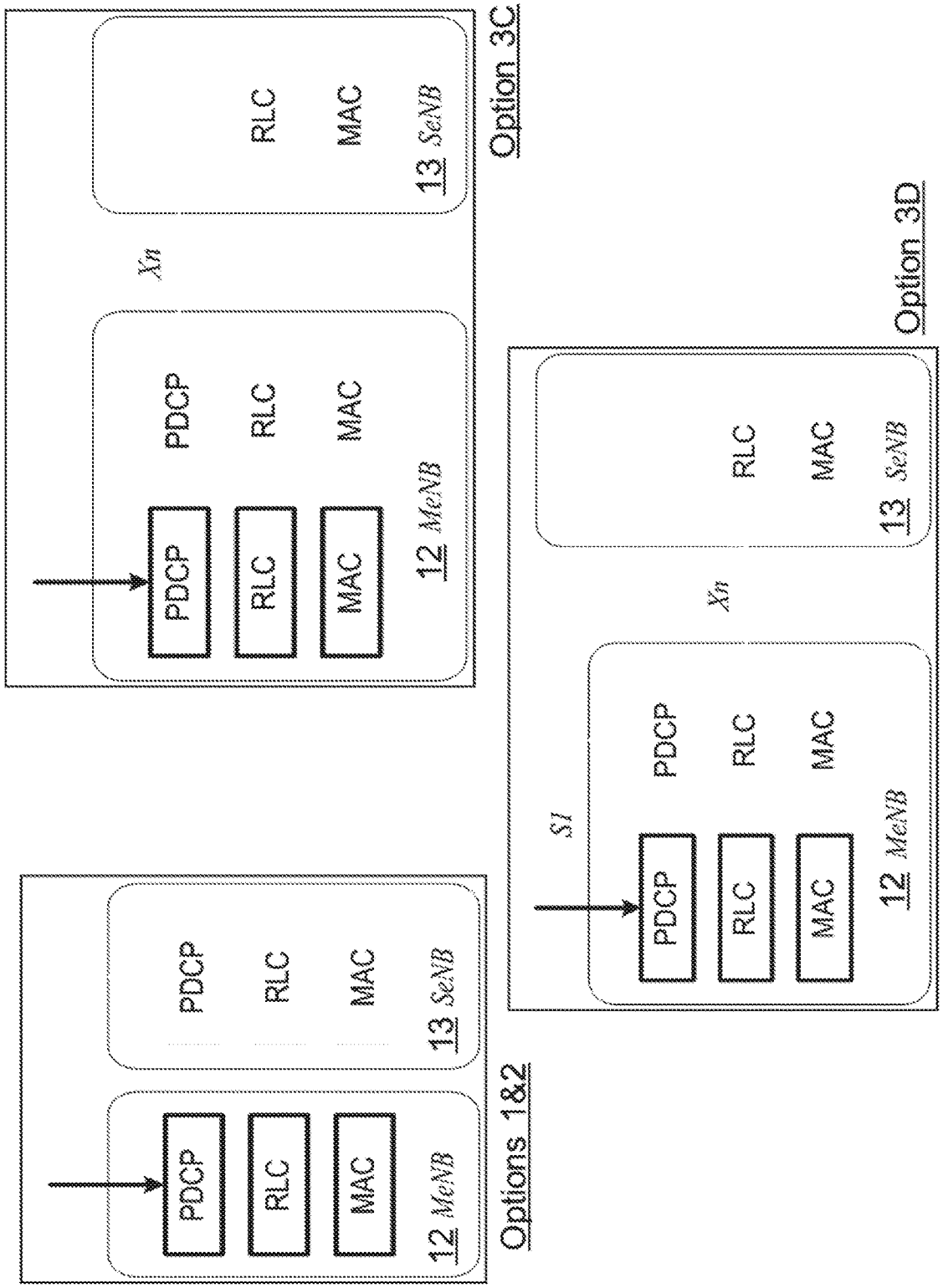
FIG. 8B shows split EPS bearer according to prior art.

The possible Layer 2 (L2) protocol stack for Option 1 and 2 is depicted in top left of FIG. 8B. It should be noted that all L2 protocols terminate in one radio network node only, either the first radio network node 12 or the second radio network node 13. Then in the right hand side of FIG. 8B and the bottom of FIG. 8B, potential protocol stacks for Option 3C-3D, called "intra-bearer split", are depicted. In the protocol stack on the right hand side, denoted as Option 3C, for split bearers there is one Packet Data Convergence Protocol (PDCP) entity in the first radio network node 12 whereas traffic is split under the PDCP layer meaning that there are different RLC entities in the each radio network node. In the protocol stack in the bottom of FIG. 8B, denoted as Option 3D, traffic is split in the RLC layer in such way that RLC entity in the first radio network node 12 handles some functions like reordering and then a slave RLC entity in the second radio network node 13 handles some other functions like re-segmentation of RLC Protocol Data Units (PDU) to fit to the transport blocks provided by the Medium Access Control (MAC)/Physical (PHY) layer. Thus, FIG. 8B discloses L2 protocol stack options for different user plane options, such as Options 1 and 2, also called option 1A and option 2A, and Options 3C and 3D.

This describes the split EPS bearer or Data radio bearer (DRB), i.e. user plane. However, the split SRB used in the embodiments herein differs as it regards control plane bearers, only carrying RRC and Non access Stratum (NAS) messages. For NR it is proposed to support split SRBs, i.e. a message generated in the MeNB RRC is passed to the PDCP in the MeNB. Depending on configurations, the PDCP may the forward the RRC message to the RLC in the MeNB or the SeNB, or if redundancy needed, it sends a copy of the message to both RLCs, and the wireless device 10 discards the second copy if it receives both. The benefit of redundant transmissions is if both links are unreliable, then chance of at least one message reaching the wireless device 10 is increased.

Figure 9:
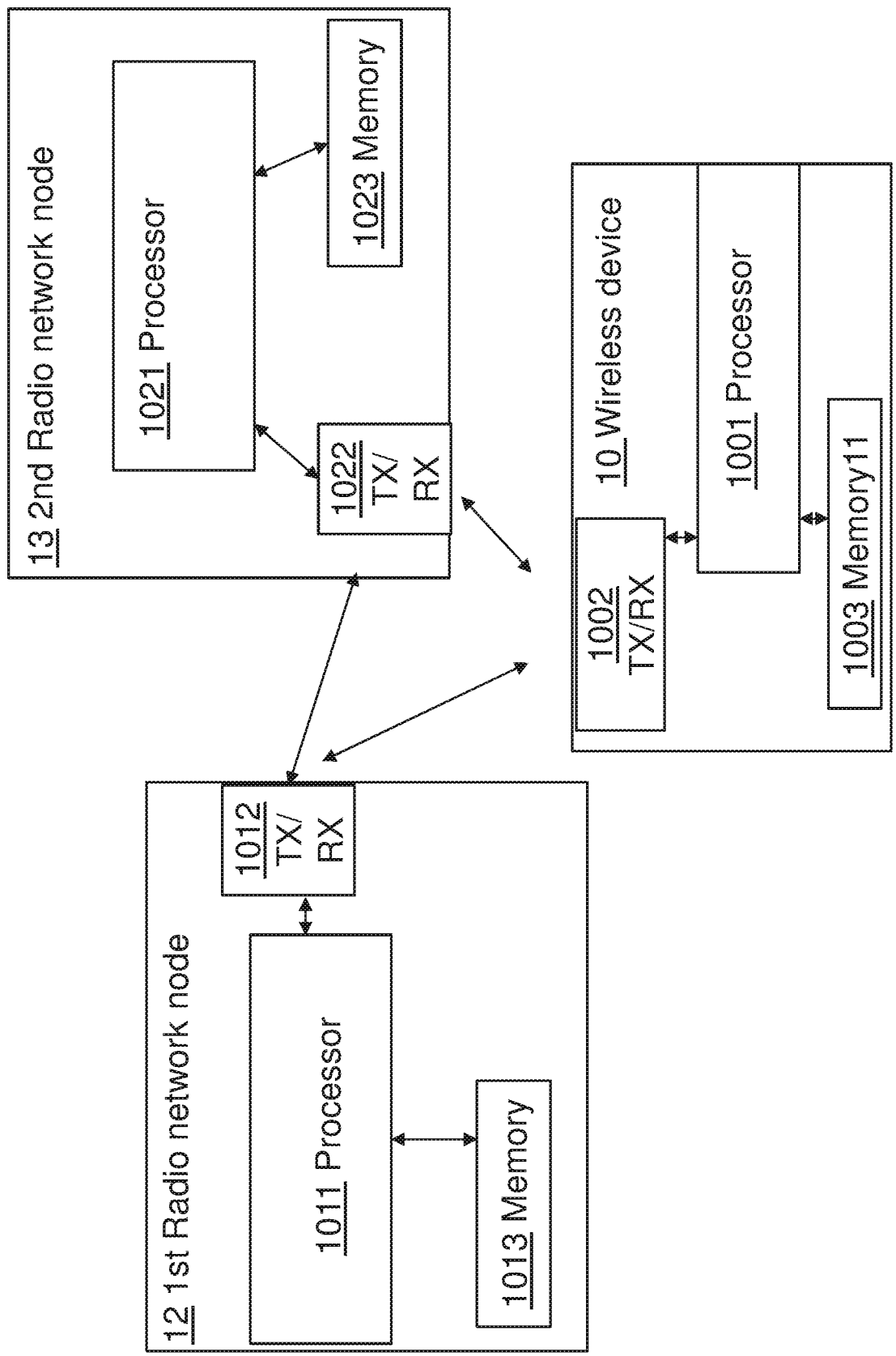
FIG. 9 shows a first radio network node, and a second radio network node configured to perform the methods herein.

According to embodiments herein the wireless device 10, the first radio network node 12, and the second radio network node 13 configured to perform the methods herein are provided. The first radio network node 12 may be the Master radio base station. The second radio network node 13 may be the secondary radio base station e.g. a low power node, i.e. lower power transmissions compared to the master radio base station. FIG. 9 is a block diagram depicting some embodiments of the first radio network node 12 and the wireless device 10 and also the second radio network node 13.

The embodiments herein for managing or handling connections may be implemented through processing circuitries such as one or more processors 1001, 1011, 1021 in the first radio network node 12, the wireless device 10 and the second radio network node 13 depicted in FIG. 9, together with computer program code for performing the functions and/or method actions of the embodiments herein. The program code mentioned above may also be provided as a computer program product, for instance in the form of a data carrier carrying computer program code for performing embodiments herein when being loaded into the first radio network node 12, the wireless device 10 and the second radio network node 13. The computer program product may be a computer-readable storage medium such as a non-transitory computer-readable storage medium.

One such carrier may be in the form of a CD ROM disc. It is however feasible with other data carriers such as a memory stick. The computer program code may furthermore be provided as pure program code on a server and downloaded to the first radio network node 12, the wireless device 10 and the second radio network node 13.

The radio network node 12, the wireless device 10 and the second radio network node 13 comprise a transmitter (TX) and a receiver (RX) or a transceiver 1002, 1012, 1022 for communication.

The radio network node 12, the wireless device 10 and the second radio network node 13 further comprise a memory 1003, 1013, 1023. The memory may be used to store configuration, thresholds, trigger conditions, failure reports, application to perform the methods herein etc.

Figure 10:
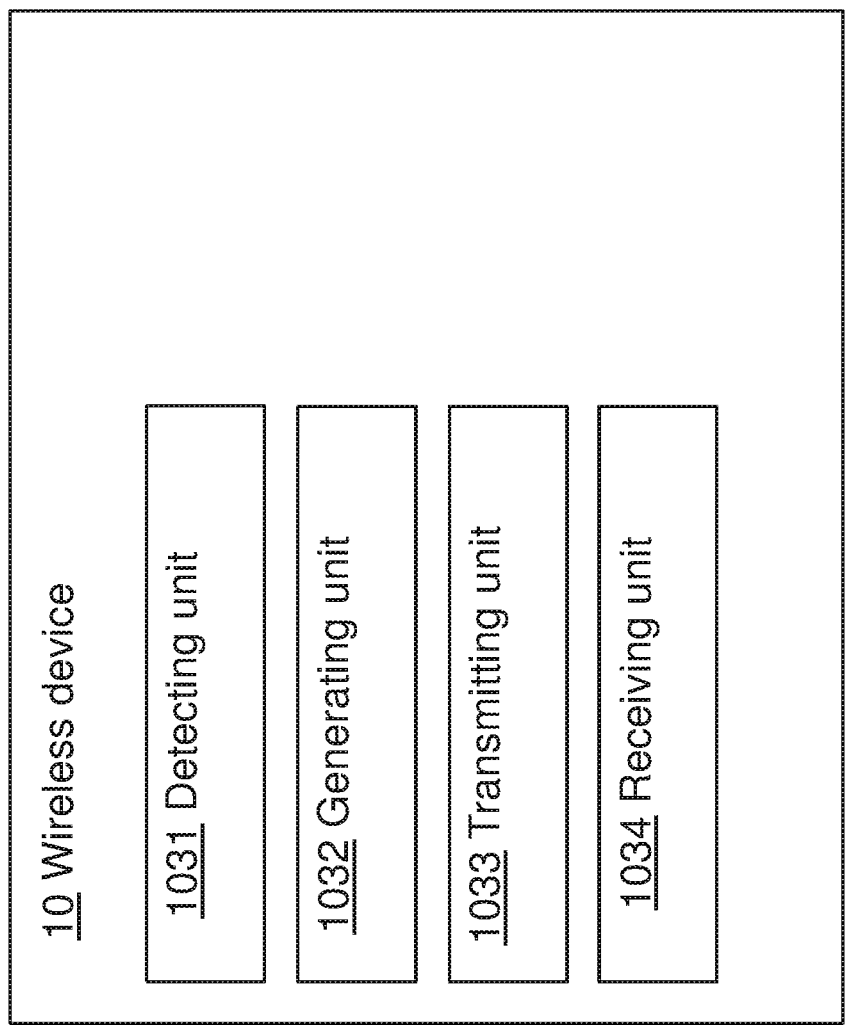
FIG. 10 is a block diagram depicting a wireless device according to embodiments herein.

FIG. 10 is a block diagram depicting the wireless device 10 for handling connections in the wireless communication network.

The wireless device is configured with the split SRB to the first radio network node 12, being the master radio network node, and the second radio network node 13, being the secondary radio network node. Thus, the wireless device is configured for using a split SRB for dual connectivity to the first and second radio network node, and is configured to transmit and receive messages on the split SRB via either a MCG or a secondary cell group SCG (or via both). Hence, the wireless device may be configured with a dual connectivity to the master and the secondary node.

The wireless device 10 may comprise a detecting unit 1031. The wireless device, the processing circuitry and/or the detecting unit 1031 is configured to detect the radio link problem to the first radio network node 12, e.g. detect a RLF to the first radio network node being the master radio base station.

The wireless device may comprise a generating unit 1032. The wireless device, the processing circuitry and/or the generating unit 1032 may be configured to generate the failure report indicating RLF and which may indicate signal strength or quality of a signal from a radio network node such as the first radio network node (the signal being associated with a cell not comprised in the MCG), the second radio network node being the secondary radio base station or the third radio network node 14.

The wireless device may comprise a transmitting unit 1033, e.g. a transmitter or a transceiver. The wireless device, the processing circuitry and/or the transmitting unit 1033 is configured to transmit the failure report to the first radio network node 12 over the split SRB via the second radio network node 13, which failure report indicates the radio link problem to the first radio network node 12. The failure report may comprise signal strength or quality of signals from the first radio network node and/or other radio network nodes. The wireless device may comprise a receiving unit 1034, e.g. a receiver or transceiver. The wireless device, the processing circuitry and/or the receiving unit 1034 may be configured to receive reconfiguration data, via the second radio network node 13, over the split SRB indicating to use the new cell at the first radio network node 12 being outside the master cell group and/or of another radio network node.

Figure 11:
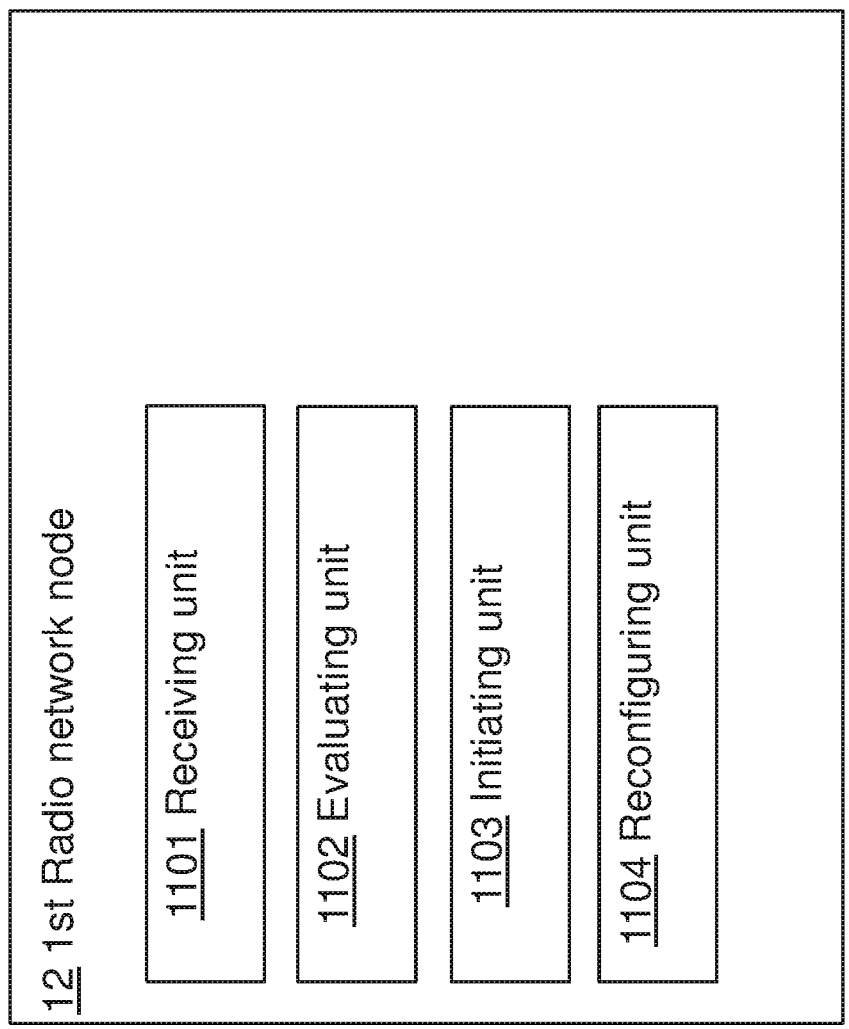
FIG. 11 is a block diagram depicting a first radio network node according to embodiments herein.

FIG. 11 is a block diagram depicting the first radio network node 12 for handling connections of the wireless device 10 in the wireless communication network.

The first radio network node is configured as the master radio network node in a dual connectivity setup to the wireless device 10, wherein the dual connectivity setup provides the split SRB to the wireless device from the first radio network node 12 and from the second radio network node 13, being a secondary radio network node. Thus, the first radio network node 12 is configured to use the split SRB connected directly to the wireless device and also connected via the second radio network node 13 to the wireless device, for providing dual connectivity to the wireless device. The first radio network may be configured to serve cells in a MCG and may be configured to serve cells outside the MCG.

The first radio network node 12 may comprise a receiving unit 1101, e.g. a receiver or a transceiver. The first radio network node 12, the processing circuitry and/or the receiving unit 1101 is configured to receive the failure report from the wireless device via the second radio network node 13, which failure report indicates a radio link problem between the first radio network node 12 and the wireless device 10. E.g. the first radio network node 10 may receive, over the split SRB from the second radio network node 13, the failure report indicating RLF at the wireless device and which may indicate signal strength or quality of a signal from a radio network node such as the first radio network node (the signal being associated with a cell not comprised in the MCG), the second radio network node being the secondary radio base station or the third radio network node. The failure report may be received over the backhaul connection.

The first radio network node 12 may comprise an evaluating unit 1102. The first radio network node 12, the processing circuitry and/or the evaluating unit 1102 is configured to perform an evaluation of the failure report for initiating a handover process of the wireless device. E.g. the first radio network node 12, the processing circuitry and/or the evaluating unit 1102 may be configured to evaluate the failure report to determine whether to perform a handover of the wireless device 10 to the first radio network node (the signal being associated with a cell not comprised in the MCG), the second radio network node being the secondary radio base station or the third radio network node.

The first radio network node 12 may comprise an initiating unit 1103. The first radio network node 12, the processing circuitry and/or the initiating unit 1103 is configured to, when evaluation indicates initiation, initiate the handover to the radio network node being within MCG, SCG or outside the MCG or the SCG.

The first radio network node 12 may comprise a reconfiguring unit 1104. The first radio network node 12, the processing circuitry and/or the reconfiguring unit 1104 may be configured to reconfigure the wireless device 10, via the second radio network node 13, over the split SRB to use the new cell at the first radio network node 12 being outside the master cell group or of another radio network node.

Figure 12:
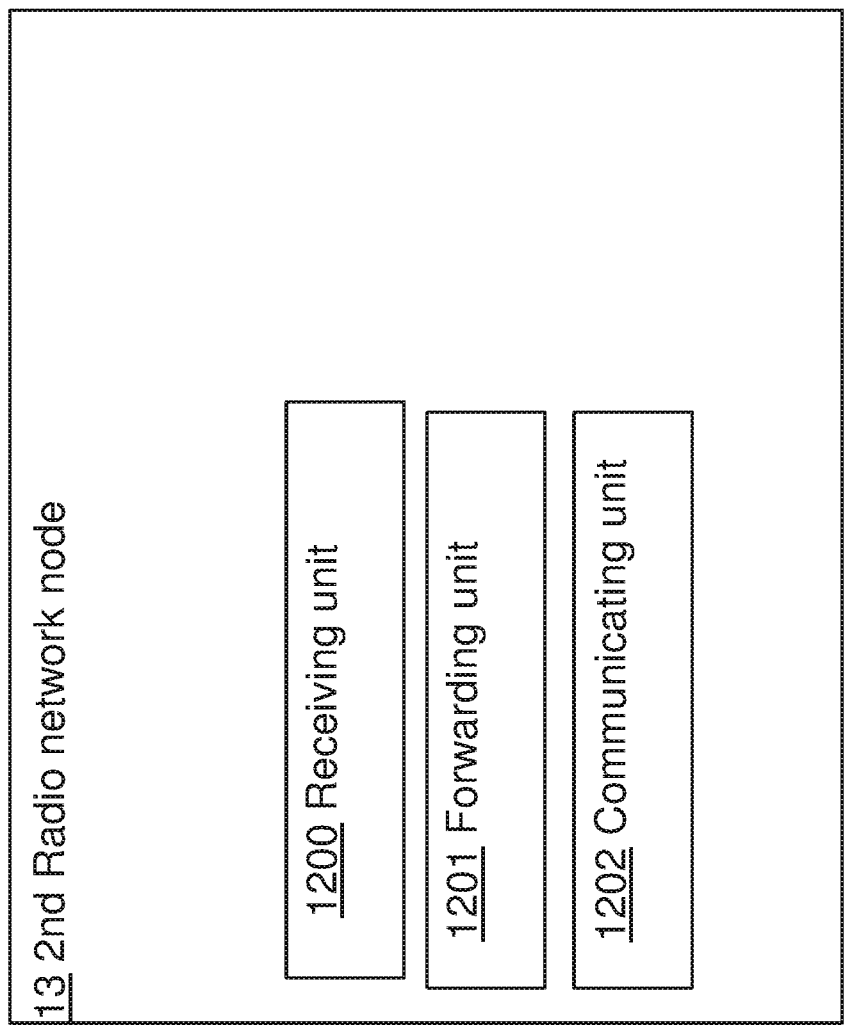
FIG. 12 is a block diagram depicting a second radio network node according to embodiments herein.

FIG. 12 is a block diagram depicting the second radio network node 13 handling connections of the wireless device in the wireless communication network or for allowing handling of connections in the wireless communication network.

The second radio network node 13 is configured as the secondary radio network node in a dual connectivity setup to the wireless device 10, wherein the dual connectivity setup provides the split SRB to the wireless device from the secondary radio network node 13 and from the first radio network node 12, being the master radio network node, The second radio network node 13 may thus be configured to use a split signaling radio bearer (SRB) connected directly to the wireless device and also connected to the first radio network node 12, for providing dual connectivity to the wireless device 10. The second radio network may be configured to serve cells in a SCG.

The second radio network node 13 may comprise a receiving unit 1200, e.g. a receiver, or a transceiver. The second radio network node 13, the processing circuitry and/or the receiving unit 1200 is configured to receive the failure report from the wireless device 10 over the split SRB, which failure report indicates the radio link problem between the first radio network node 12 and the wireless device 10.

The second radio network node 13 may comprise a forwarding unit 1201, e.g. a receiver, transmitter or a transceiver. The second radio network node 13, the processing circuitry and/or the forwarding unit 1201 is configured to forward the failure report to the first radio network node 12. E.g. The second radio network node 13, the processing circuitry and/or the forwarding unit 1201 may be configured to forward, over the split SRB to the first radio network node 12, the failure report indicating RLF at the wireless device 10 and which may indicate signal strength or quality of a signal from a radio network node such as the first radio network node (the signal being associated with a cell not comprised in the MCG), the second radio network node or the third radio network node. The second radio network node 13, the processing circuitry and/or the forwarding unit 1201 may be configured to forward the failure report over the backhaul connection to the first radio network node 12. The second radio network node 13, the processing circuitry and/or the forwarding unit 1201 may be configured to forward the reconfiguration data, from the first radio network node 12 to the wireless device 10, over the split SRB indicating to use the new cell at the first radio network node 12 being outside the master cell group and/or of another radio network node.

The second radio network node 13 may comprise a communicating unit 1202. The second radio network node 13, the processing circuitry and/or the communicating unit 202 may be configured to perform a handover of the wireless device initiated by the first radio network node 12.

It should be noted that each unit may be exemplified as a respective module.

In some embodiments a more general term "radio network node" is used and it can correspond to any type of radio network node or any network node, which communicates with a wireless device and/or with another network node.

Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc, Operation and Maintenance (O&M), Operation Support System (OSS), Self-Organizing Network (SON), positioning node e.g. Evolved Serving Mobile Location Centre (E-SMLC), Minimizing Drive Test (MDT) etc. Note that in a general scenario the term "radio network node" can be substituted with "transmission point". Several TPs may be logically connected to the same radio network node but if they are geographically separated, or are pointing in different propagation directions, the TPs will be subject to the same issues as different radio network nodes. In subsequent sections, the terms "radio network node" and "TP" can be thought of as interchangeable.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the wireless device receives and/or transmit signals (e.g. data) e.g. NR, LTE, LTE FDD/TDD, WCDMA/HSPA, GSM/GERAN, Wi Fi, WLAN, CDMA2000 etc.

As will be readily understood by those familiar with communications design, that functions means, units or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

According to some embodiments it is herein disclosed a method performed by a wireless device for handling a connection in a wireless communication network. The wireless device is configured with RRC diversity using a split signaling radio bearer (SRB) i.e. for dual connectivity, and may transmit and receive RRC messages on the split SRB via either a master cell group (MCG) or a secondary cell group (SCG) (or via both). The wireless device detects a RLF to a first radio network node being a master radio base station. The wireless device generates a failure report indicating RLF and may indicate signal strength or quality of a signal from a radio network node such as the first radio network node (the signal being associated with a cell not comprised in the MCG), the second radio network node being the secondary radio base station or a third radio network node. The wireless device transmits the failure report over the split SRB to the first radio network node via the second radio network node. The secondary radio base station may either serve cells included in the SCG, or it may serve a cell outside the SCG.

According to some embodiments it is herein disclosed a method performed by a first radio network node for handling a wireless device in a wireless communication network. The first radio network node being a master radio base station participating in providing dual connectivity to the wireless device together with a second radio network node being a secondary radio base station. The first radio network node receives a failure report from the wireless device over a split SRB via the second radio network node. The failure report indicates RLF and may indicate signal strength or quality of a signal from a radio network node such as the first radio network node (the signal being associated with a cell not comprised in a MCG of the wireless device), the second radio network node or a third radio network node. The first radio network node further evaluates the failure report whether to initiate a handover of the wireless device within the first radio network node, or to the second radio network node or the third radio network node or not to initiate a handover.

According to some embodiments it is herein disclosed a method performed by the second radio network node for enabling handling of connection of a wireless device. The second radio network node is configured to use a split SRB connected directly to the wireless device and also being connected to a first radio network node for providing dual connectivity to the wireless device. The second radio network is configured to serve cells included in a SCG, or it may serve a cell outside the SCG. The second radio network node forwards, over the split SRB to the first radio network node, the failure report, from the wireless device, indicating RLF at the wireless device and which failure report may indicate signal strength or quality of a signal from a radio network node such as the first radio network node (the signal being associated with a cell not comprised in the MCG), the second radio network node or the third radio network node.

In LTE, RLM and RLF is one of the key procedures. According to RLM procedure in LTE, wireless device can know if it is still within the coverage of its original serving cell or not. If not, wireless device will stop its uplink transmission and try to reselect to a new cell and re-establish its RRC connection. By this way, wireless device encountering RLF will not cause interference to other normal wireless device. Due to similar reasons, RLM and RLF is needed in NR.

In this contribution, we will discuss some difference in NR compared to LTE and then its impact on RLM and RLF in NR.

The purpose of the Radio Link Monitoring (RLM) function in the wireless device is to monitor the downlink radio link quality of the serving cell in RRC_CONNECTED state. Monitoring is based on the Cell-Specific Reference Signals (CRS). This in turn enables the wireless device when in RRC_CONNECTED state to determine whether it is in-sync or out-of-sync with respect to its serving cell as described in TS 36.213, Section 4.2.1.

The wireless device's estimation of the downlink radio link quality is compared with out-of-sync and in-sync thresholds, Qout and Qin respectively, for the purpose of RLM. These thresholds are expressed in terms of the Block Error Rate (BLER) of a hypothetical Physical Downlink Control Channel (PDCCH) transmission from the serving cell. Specifically, Qout corresponds to a 10% BLER while Qin corresponds to a 2% BLER. The same threshold levels are applicable with and without DRX. The mapping between the cell specific RS based downlink quality and the hypothetical PDCCH BLER is up to the wireless device implementation. However, the performance is verified by conformance tests defined for various environments, as described in TS 36.521.

Observation 1 In LTE, RLM is specified largely in RAN1 specifications. Whether wireless device is in-sync or out-of-sync is based on hypothetical quality of PDCCH.

Here we assume RLM in NR need input from RAN1 as well, such as which RS is used for RLM, how to judge that the wireless device is in-sync or out-of-sync. However, it is our understanding that the principle of RLM in LTE should be reused in NR, i.e. the quality of downlink control channel is used to judge whether wireless device is in-sync or out-of-sync.

In NR RLM should follow the same principle as in LTE, i.e. the hypothetical quality of downlink control channel in NR is used to judge if wireless device is in-sync or out-of-sync.

Although RAN1 has not decide which RS will be reused for RLM or whether a new RS will be defined, it is our understanding that the quality measurement on that RS should reflect the downlink control channel quality correctly. In that sense, it seems premature to make further agreements on RLM before RAN1 progresses its work on the design of DL control channels, including the aspects associated to how they would be beamformed.

One of the RAN1 agreements states that NR should support wireless device/PDCCH-specific DM-RS for PDCCH reception. At least for beamforming, wireless device may assume same precoding operation for PDCCH and associated DM-RS for PDCCH. That is, PDCCH in NR is based on DMRS and could use wireless device specific beamforming. In addition to it, RAN1 states that NR should support using the same or different beams on control and the corresponding data transmissions.

Observation 2 PDCCH in NR is based on DMRS and should support using the same or different beams on control and the corresponding data transmissions.

Due to this reason, we think other RS discussed in NR, e.g. mobility RS, beam-specific RS or synchronization RS should be carefully considered since they may not be suitable as these RS may use quite different beamforming from PDCCH.

Furthermore, still according to LTE RLM principle, the RS for RLM need to be transmitted in the same frequency domain as PDCCH. Mobility RS is quite probably a narrow band RS which does not match with the frequency domain where PDCCH in NR will be transmitted. From this perspective, mobility RS is not suitable for RLM as well.

Observation 3 For NR, one cannot assume that the mobility RS is used for RLM DMRS for PDCCH is quite natural to be used for RLM purpose. One drawback is that DMRS only exist when wireless device is scheduled. How to let wireless device know whether it is in-sync or out-of-sync when wireless device is not scheduled need be solved.

Observation 4 In NR, the RS used for RLM need to reflect PDCCH quality accurately.

In NR, especially at high frequency, cell may be covered by multiple beams instead of one beam. There are some discussions to make RLF based on a group of beams instead of one beam. Then from RAN2 perspective, we need to know whether this will have impact on wireless device L3 or not. There are two possibilities: The first alternative is that the wireless device L1 send in-sync and out-of-sync indication per beam, and then L3 need to maintain multiple set of N310, N311, T310 etc. The second alternative is that wireless device L1 only send one in-sync and out-of-sync indication for all relevant beams, then wireless device L3 does not know the existence of multiple beams. wireless device L3 behaviour is not affected by how many beams wireless device is working at L1. Whether L3 will be impacted or not depends on which RS will be used for RLM which need decision from RAN1. Therefore we think whether L3 need to maintain one or multiple in-sync/out-of-sync counter and timer can be studies later when which RS to be used for RLM is decided in RAN1.

In NR, whether L3 need to maintain one or multiple in-sync/out-of-sync indicator should be studied once RAN1 has decided which RS is used for RLM In LTE, when N310 consecutive out-of-sync is detected, T310 starts. In LTE spec, there is no description about how wireless device should do until T310 is expired. wireless device seems just trying to detect CRS as before. This is reasonable as CRS or LTE cell coverage is static.

In NR, when T310 is trigger due to out-of-sync detection on some RS transmitted in some beam, it may be possible that NW can still reach the wireless device from other beams which are not configured to the wireless device before. Then if wireless device can inform NW it is experiencing out-of-sync, NW could send more beam/RS toward wireless device to recover wireless device before RLF is declared.

In NR, when T310 triggered, wireless device could inform NW such information so that more beam/RS can be transmitted from NW.

When RLF is triggered in LTE, RRC connection re-establishment procedure is executed. wireless device first does cell reselection. If the new cell selected cell is still LTE cell, wireless device initiates random access procedure on that cell, and then send RRCConnectionReestablishmentRequest message toward NW. If the new selected cell is an inter-RAT cell, then wireless device should perform the actions upon leaving RRC_CONNECTED.

Here we see two areas for discussion for NR.

First, if the new selected cell is LTE cell, wireless device should continue with RRC re-establishment procedure instead of leaving RRC_CONNECTED. This is reasonable as long as LTE cell also connect to Next Generation Core as wireless device can build up its context in LTE cell from old NR cell similar as wireless device moves around from NR cell to LTE cell in RRC_INACTIVE state.

When wireless device encounter RLF in NR and reselect to LTE cell, RRC connection re-establishment procedure is applied as long as LTE cell connect to NextGenCore.

Second, when NR works with carrier aggregation, since the carrier that NR work could be at high frequency, PCell may not be always the most robust carrier. When PCell encounter RLF, it is possible that SCell is still alive. Therefore, it is reasonable that wireless device does not initiate RRC connection re-establishment procedure when PCell encounters RLF but SCell is still OK. wireless device can report such information to NW via SCell. When NW gets such information, NW can initiate a light-weight PCell change procedure to change PCell on a good SCell. wireless device initiate RRC connection re-establishment procedure only when all serving cells encounter radio link issue.

For carrier aggregation in NR, when wireless device encounter RLF in PCell, as long as one SCell is alive, instead of initiate RRC connection re-establishment procedure, wireless device report such failure to NW to trigger a PCell handover procedure.

RRC connection re-establishment procedure is only initiated when all serving Cell has radio link issue.

For LTE-NR tight interworking, since it is possible that NR serves as master node while LTE serve as secondary node, and when MCG fails, SCG could still be alive. It is therefore reasonable to not initiate RRCConnectionReestablisment procedure if RLF is declared for MCG but not for SCG. In this case, wireless device can report such information to NW via SCG. This is achievable as long as RRC diversity is supported. When NW gets such information, NW can initiate master and secondary node role swap using a light-weight procedure. RRC connection reestablishment procedure is only initiated when both MCG and SCG encounter radio link failure. In this way, NW and wireless device performance can be improved.

Similar solution can be applied to NR dual connectivity.

For NR dual connectivity or LTE-NR tight interworking, when RLF is declared at MCG but not SCG, instead of initiate RRC connection re-establishment procedure, wireless device report such failure to NW via SCG as long as SCG is still alive.

RRC connection re-establishment procedure is only initiated when both MCG and SCG encounter RLF Proposal 1 In NR RLM should follow the same principle as in LTE, i.e. the hypothetical quality of downlink control channel in NR is used to judge if wireless device is in-sync or out-of-sync.

Proposal 2 In NR, whether L3 need to maintain one or multiple in-sync/out-of-sync indicator should be studied once RAN1 has decided which RS is used for RLM Proposal 3 In NR, when T310 triggered, wireless device could inform NW such information so that more beam/RS can be transmitted from NW.

Proposal 4 When wireless device encounter RLF in NR and reselect to LTE cell, RRC connection re-establishment procedure is applied as long as LTE cell connect to NextGenCore.

Proposal 5 For carrier aggregation in NR, when wireless device encounter RLF in PCell, as long as one SCell is alive, instead of initiate RRC connection re-establishment procedure, wireless device report such failure to NW to trigger a PCell handover procedure.

Proposal 6 RRC connection re-establishment procedure is only initiated when all serving Cell has radio link issue.

Proposal 7 For NR dual connectivity or LTE-NR tight interworking, when RLF is declared at MCG but not SCG, instead of initiate RRC connection re-establishment procedure, wireless device report such failure to NW via SCG as long as SCG is still alive.

Proposal 8 RRC connection re-establishment procedure is only initiated when both MCG and SCG encounter RLF It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method, performed by a wireless device, for handling connections in a wireless communication network, wherein the wireless device is configured with a split signaling radio bearer to a first radio network node and a second radio network node, wherein the first radio network node is a master radio network node and the second radio network node is a secondary radio network node, the method comprising:
  detecting a radio link problem to the first radio network node;
  transmitting a failure report to the first radio network node over the split signaling radio bearer via the second radio network node, the failure report indicating the radio link problem to the first radio network node; and
  after transmitting the failure report, obtaining a new security key for the second radio network node responsive to the first radio network node updating the second radio network node with the new security key.

2. The method of claim 1, wherein the wireless device is configured with dual connectivity to the master and secondary radio network nodes.

3. The method of claim 1, wherein the failure report comprises signal strength or quality of signals from the first radio network node and/or other radio network nodes.

4. The method of claim 1, further comprising receiving reconfiguration data, via the second radio network node and over the split signaling radio bearer, indicating to use a new cell, the new cell being of the first radio network node and outside a master cell group and/or of another radio network node.

5. A method, performed by a first radio network node, for handling connections of a wireless device in a wireless communication network, wherein the first radio network node is a master radio network node in a dual connectivity setup to the wireless device, wherein the dual connectivity setup provides a split signaling radio bearer to the wireless device from the first radio network node and from a second radio network node, wherein the second radio network node is a secondary radio network node, the method comprising:
  receiving a failure report from the wireless device via the second radio network node, the failure report indicating a radio link problem between the first radio network node and the wireless device;
  performing an evaluation of the failure report for initiating a handover process of the wireless device;
  updating the second radio network node with a new security key; and
  in response to receiving the failure report, sending the new security key to the wireless device via the second radio network node.

6. The method of claim 5, further comprising, in response to the evaluation indicating initiation, initiating the handover to a radio network node being within a Master Cell Group (MCG), within a Secondary Cell Group (SCG), or outside the MCG and the SCG.

7. The method of claim 6, further comprising reconfiguring the wireless device, via the second radio network node and over the split signaling radio bearer, to use a new cell, wherein the new cell is of the first radio network node outside the MCG or of another radio network node.

8. The method of claim 5, wherein the failure report is received over a backhaul connection.

9. A wireless device for handling connections in a wireless communication network, wherein the wireless device is configured with a split signaling radio bearer to a first radio network node and a second radio network node, wherein the first radio network node is a master radio network node and the second radio network node is a secondary radio network node, the wireless device comprising:
  processing circuitry;
  memory containing instructions executable by the processing circuitry whereby the wireless device is operative to:
    detect a radio link problem to the first radio network node;
    transmit a failure report to the first radio network node over the split signaling radio bearer via the second radio network node, the failure report indicating the radio link problem to the first radio network node; and
    after transmit the failure report, obtain a new security key for the second radio network node responsive to the first radio network node updating the second radio network node with the new security key.

10. The wireless device of claim 9, wherein the wireless device is configured with a dual connectivity to the master and secondary radio network nodes.

11. The wireless device of claim 9, wherein the failure report comprises signal strength or quality of signals from the first radio network node and/or other radio network nodes.

12. The wireless device of claim 9, wherein the instructions are such that the wireless device is operative to receive reconfiguration data, via the second radio network node and over the split signaling radio bearer, indicating to use a new cell, the new cell being of the first radio network node outside a master cell group and/or of another radio network node.

13. A first radio network node for handling connections of a wireless device in a wireless communication network, wherein the first radio network node is configured as a master radio network node in a dual connectivity setup to the wireless device, wherein the dual connectivity setup provides a split signaling radio bearer to the wireless device from the first radio network node and from a second radio network node, wherein the second radio network node is a secondary radio network node, the first radio network comprising:
  processing circuitry;
  memory containing instructions executable by the processing circuitry whereby the first radio network node is operative to:
    receive a failure report from the wireless device via the second radio network node, the failure report indicating a radio link problem between the first radio network node and the wireless device;
    perform an evaluation of the failure report for initiating a handover process of the wireless device; and
    in response to receiving the failure report, receive a new security key for the second radio network node responsive to the first radio network node updating the second radio network node with the new security key.

14. The first radio network node of claim 13, wherein the instructions are such that the first radio network node is operative to, when the evaluation indicates initiation, initiate the handover to a radio network node within a Master Cell Group (MCG), within a Secondary Cell Group (SCG), or outside the MCG and the SCG.

15. The first radio network node of claim 14, wherein the instructions are such that the first radio network node is operative to reconfigure the wireless device, via the second radio network node and over the split signaling radio bearer, to use a new cell; the new cell being of the first radio network node outside a master cell group or of another radio network node.

16. The first radio network node of claim 13, wherein the instructions are such that the first radio network node is operative to receive the failure report over a backhaul connection.

\* \* \* \* \*